United States Patent [19]
Gordon

[11] Patent Number: 4,781,023
[45] Date of Patent: Nov. 1, 1988

[54] WAVE DRIVEN POWER GENERATION SYSTEM

[75] Inventor: Carroll K. Gordon, New Orleans, La.

[73] Assignee: Sea Energy Corporation, New Orleans, La.

[21] Appl. No.: 126,969

[22] Filed: Nov. 30, 1987

[51] Int. Cl.$^4$ .............................................. F03B 13/12
[52] U.S. Cl. ........................................ 60/506; 60/505;
   60/398; 290/42; 290/53; 417/332
[58] Field of Search ................. 60/398, 495, 497, 500,
   60/505, 506; 290/42, 53; 417/330, 331, 332

[56] References Cited

U.S. PATENT DOCUMENTS

| | | | |
|---|---|---|---|
| Re. 31,111 | 12/1982 | Hagen | 60/500 |
| 562,317 | 6/1896 | Martin . | |
| 632,139 | 8/1899 | Norton . | |
| 694,242 | 2/1902 | Borchert . | |
| 738,996 | 9/1903 | Hagen . | |
| 855,258 | 5/1907 | Neal . | |
| 882,883 | 3/1908 | Hillson . | |
| 917,411 | 4/1909 | Casella et al. . | |
| 1,072,272 | 9/1913 | Thomas . | |
| 1,169,356 | 1/1916 | Sanderson . | |
| 1,202,742 | 10/1916 | Lane . | |
| 1,408,094 | 2/1922 | Kersey . | |
| 1,471,222 | 10/1923 | Taylor . | |
| 1,528,165 | 3/1925 | Pasquariello . | |
| 1,567,470 | 12/1925 | Settle . | |
| 1,647,025 | 10/1927 | Stich . | |
| 1,688,032 | 10/1928 | Blair . | |
| 1,746,613 | 2/1930 | Shuler . | |
| 1,757,166 | 5/1930 | Brady . | |
| 1,818,066 | 8/1931 | Jouy . | |
| 1,867,780 | 7/1932 | Tidwell . | |
| 1,925,742 | 9/1933 | Bamber et al. | 253/11 |
| 1,953,285 | 4/1934 | Arner | 253/10 |
| 1,962,047 | 6/1934 | Young | 103/70 |
| 3,487,228 | 12/1969 | Kriegel | 290/52 |
| 3,758,788 | 9/1973 | Richeson | 290/42 |
| 3,879,950 | 4/1975 | Yamada | 60/698 |
| 3,928,967 | 12/1975 | Salter | 60/398 |
| 4,013,382 | 3/1977 | Diggs | 417/332 |
| 4,048,801 | 9/1977 | Tornabene | 60/502 |
| 4,073,142 | 2/1978 | Tornabene | 60/502 |
| 4,077,213 | 3/1978 | Hagen | 60/500 |
| 4,098,084 | 7/1978 | Cockerell | 60/500 |
| 4,118,932 | 10/1978 | Sivill | 60/500 |
| 4,152,895 | 5/1979 | Wirt | 60/398 |
| 4,208,875 | 6/1980 | Tsubota | 60/495 |
| 4,241,579 | 12/1980 | Borgren | 60/504 |
| 4,389,843 | 6/1983 | Lamberti | 60/505 X |
| 4,392,349 | 7/1983 | Hagen | 60/505 X |
| 4,408,454 | 10/1983 | Hagen et al. | 60/500 |
| 4,480,966 | 11/1984 | Smith | 60/501 X |

OTHER PUBLICATIONS

"Available Ocean Wave Power and Prediction of Power Extracted by a Contouring Raft Conversion
(List continued on next page.)

*Primary Examiner*—Stephen F. Husar
*Attorney, Agent, or Firm*—David A. Rose

[57] ABSTRACT

This invention relates to a system for the generation of useful energy from the power in ocean waves. The wave power generation system is an array of individual absorber units each consisting of a buoyant raft, connected to a stable mooring assembly by means of a yoke so as to allow relative motion between the buoyant raft and the mooring assembly in response to the motion of the waves. A linkage between the buoyant raft and the yoke allows conversion of the relative motion into mechanical, hydraulic and/or electrical power. The system is designed to be responsive to the broad spectrum of frequencies present in ocean waves. The response characteristics of the individual absorber units can be changed to match the conditions of the incident waves in order to provide maximum power conversion efficiency. Each unit of the array is tuned to a condition for maximum power absorption by control of the shape, mass, moments, and power extraction impedance. The system is deployed so as to minimize the capital and operating cost of the system. The deployment configuration is selected to produce minimum aesthetic effect on the environment yet be close enough to shore to keep electrical transmission and mooring costs to a minimum and to extract the maximum amount of power per unit area of installation. The system is capable of producing base load power to a large electrical grid.

68 Claims, 15 Drawing Sheets

OTHER PUBLICATIONS

System", by E. L. Burdette and C. K. Gordon, Journal of Energy Resources Technology, Dec. 1983.

"Observation of the Power Spectrum of Ocean Waves Using a Cloverleaf Buoy", by Hisashi Mitsuyasu, Fukuzo Tasai, Toshiro Suhara, Research Institute for Applied Mechanics, Kyushu University, Fukuoka, Japan, Sep. 5, 1979.

Marine Hydrodynamics, by J. N. Newman, The MIT Press (1977), pp. 285–311.

Principles of Naval Architecture, by J. E. Comstock, Society Naval Architects, 9/1967, pp. 611–620.

"Effect of Various Spectral Formulations in Predicting Responses of Marine Vehicles and Ocean Structures", by Michael K. Ochi and Susan Bales, D. W. Taylor Naval Ship R&D Center, Offshore Technology Conference, May 2–5, 1977.

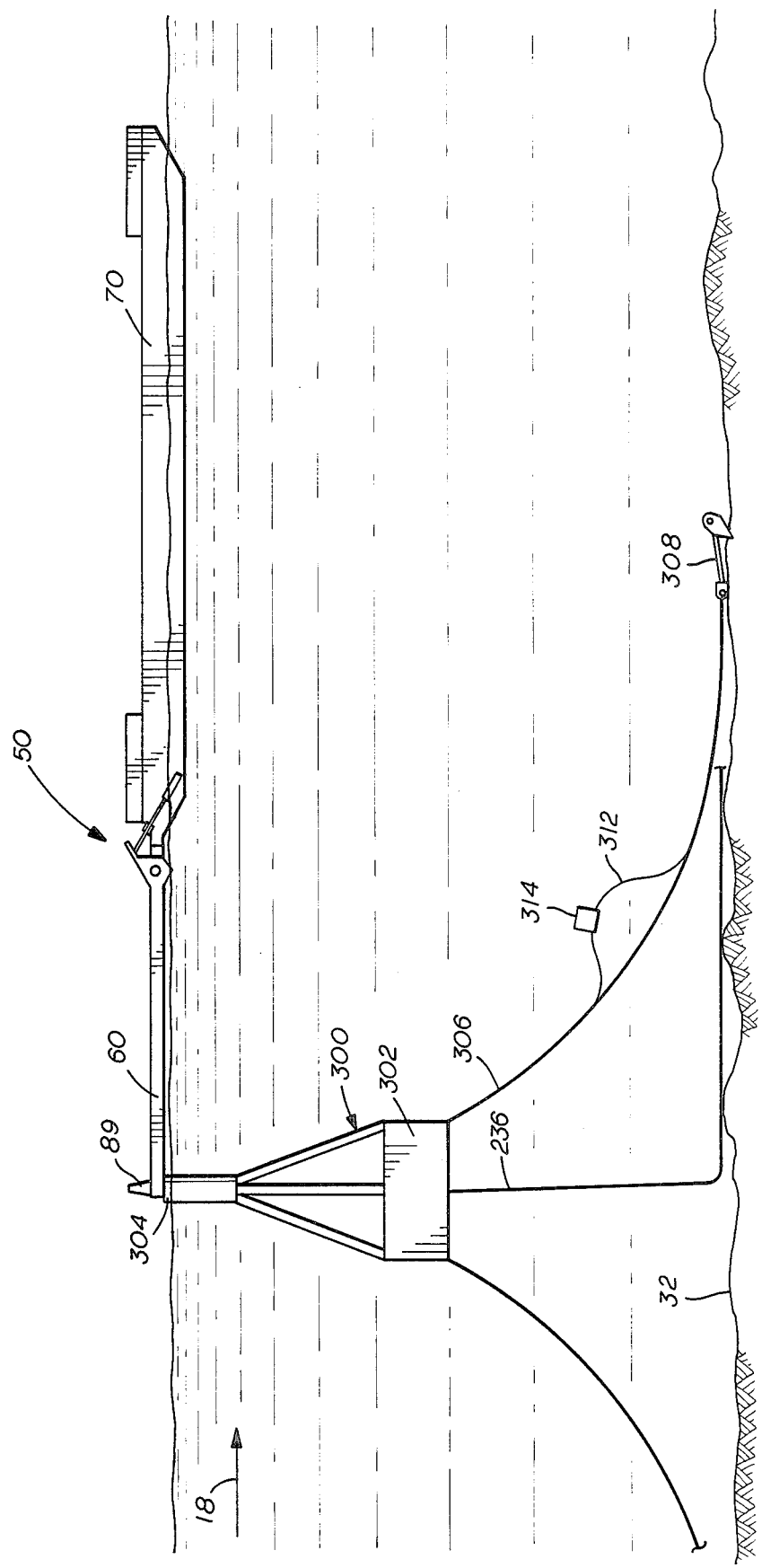

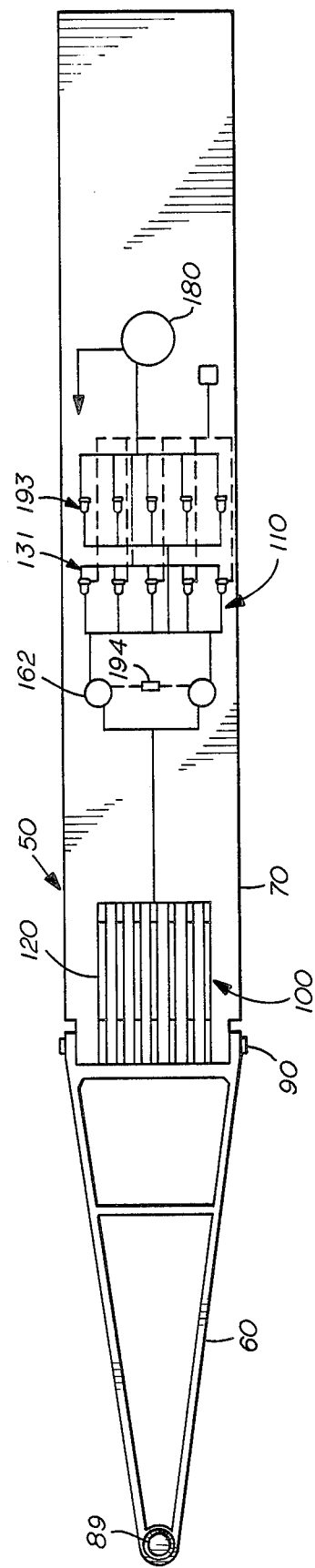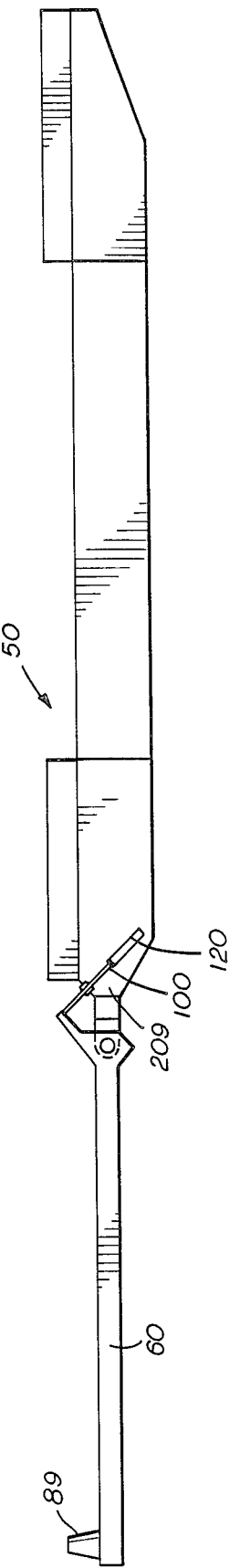
FIG.4B
FIG.4C

WAVE DRIVEN POWER GENERATION SYSTEM

BACKGROUND OF THE INVENTION

This invention relates to a power generation system which extracts useful power from water waves. In particular, the invention relates to the interaction of various elements of the design of a wave driven generator unit. More specifically, the present invention absorbs wave energy, converts that energy into electrical energy, and transports that electrical energy from its offshore point of generation to a land-based power grid. Thus, the present invention produces large quantities of power economically for a public utility or large industrial user.

Methods and apparatus designed to capture and convert wave energy into a variety of other forms of useful energy are described in a number of prior art publications and patents. See, for example, U.S. Pat. Nos. 562,317, 632,139, 694,242, 738,996, 882,883, and 917,411. These early patents relied on mechanical linkages between fixed floats to trap the rocking, lifting, falling, or longitudinal motion of the waves but were highly inefficient due to their mechanical complexities. Some of the most mechanically complex devices are illustrated in U.S. Pat. Nos. 1,169,356, 1,471,222, 1,528,165, 1,818,066.

A study of the prior art shows that most inventions designed to convert wave energy into useful energy utilize either (1) the kinetic energy of the waves by devices such as paddle wheels, or (2) the wave's potential energy by a float or a series of floats. Examples of inventions which rely upon kinetic energy are disclosed in U.S. Pat. Nos. 1,072,272, 4,152,895 and 4,208,875. The vast majority of prior art inventions for converting wave energy into useful energy rely upon the potential energy of a wave, i.e., the lifting power of the wave. Many such inventions rely upon a single float for absorbing a wave's energy. See, for example, U.S. Pat. Nos. 562,317, 738,996, 1,202,742, 1,471,222, 1,647,025, 1,746,613, 1,953,285, 1,962,047, and 3,487,228. Other early inventions rely upon a series of floats for converting the wave's potential energy into other forms, examples of which include U.S. Pat. Nos. 632,139, 855,258, 882,883, 917,411, 1,408,094, 1,567,470, 1,688,032, 1,867,780, and 1,925,742.

U.S. Pat. No. Re. 31,111 relates to wave driven generators comprising a plurality of floats that are tuned to be responsive to incoming waves by the use of different sized floats whereby wave energy is extracted by the floats and converted into hydraulic energy. This hydraulic energy is then employed to drive a turbine generator and generate electricity. The floats are connected together by hinges as to form what is defined as a "Hagen" array. Each float is pivotally connected to a larger float in such a manner as to allow relative movement between the floats. Hydraulic pistons and cylinders are mounted between the floats. These hydraulic pistons and cylinders are responsive to the relative movement between the hinged floats, and generate hydraulic energy in response to such movement. This hydraulic energy is stored in an accumulator which is then converted into electrical energy by a turbine-generator, located onboard of one of the floats. The array is moored to the sea floor by cables in a manner such that it is free to rotate so the floats maintain a desired position, i.e. facing the incoming waves.

A conceptual presentation of a wave energy conversion system appears in *Transactions of the ASME*, page 492, Vol. 105, December 1984. The system depicted therein includes an array, composed of rafts or floats of various lengths hinged together, and hydraulic pistons and cylinders positioned between the floats for absorbing wave energy and converting it into electrical energy. An articulated raft system, or array, is shown moored to the sea floor by a single anchor leg mooring system. A schematic representation of an onboard power conversion system is illustrated with the components of the system including hydraulic pistons and cylinders, accmulators, turbines, and generators. A submarine cable is illustrated for transmitting the electrical energy that is generated.

The Hagen-array system of hinged rafts suffers from the fact that the unit length of the rafts perpendicular to the crests (parallel to the line of incidence) must be approximately one wave length of the incident waves. The result is good efficiency relative to the beam dimension of the rafts but poor efficiency in terms of energy extracted per raft size or weight. The poor efficiency results because the Hagen-array system does not make use of the physical parameters of the rafts other than unit length to tune the system properly so as to respond to the broad spectrum of wave frequencies that occur in the ocean.

A number of patents disclose utilizing a plurality of floats to convert wave energy into useful energy. For example U.S. Pat. Nos. 4,392,349, 4,098,084, 3,879,950, and 1,408,094 disclose raft-like floats, hinged together, so as to form articulated chains or arrays. U.S. Pat. Nos. 4,241,579, 4,073,142, 4,048,801, 1,757,166 disclose energy conversion systems where a plurality of buoy-like floats are positioned in particular patterns so that wave energy resulting in upward and downward reciprocation of the floats is converted into useful energy. U.S. Pat. No. 3,758,788 discloses an energy conversion system where buoyant structures are connected together by pivotal structures and bellows which are activated by movement between the buoyant structures. The positive air or fluid pressure is then used to drive a turbine generator to generate electrical energy. A variety of hinges are disclosed for connecting rafts or floats together. For example, see U.S. Pat. Nos. 4,098,084, 3,879,950, 1,408,094, 917,411, 882,883, and 632,139. Additionally, U.S. Pat. No. 4,118,932 discloses hinging two floats together whereby the hinge also forms a pump which generates hydraulic energy in response to the relative rotational movement of the floats about the hingeline. Other prior art patents disclose a variety of pistons or bellows to convert wave energy into hydraulic energy, such as U.S. Pat. Nos. 4,408,454, 4,208,875, 4,013,382, 3,879,950, 1,757,166. Additionally, the device known as the Salter "nodding duck" which is disclosed in U.S. Pat. No. 3,928,967 utilizes a variable stroke rotary pump to convert the pivotal motion of its energy removing member into usable hydraulic energy.

U.S. Pat. No. 3,928,967 describes a system composed of a plurality of wave power absorbers deployed so as to intercept power from a line parallel to the incident wave crests that is long compared to the dimension perpendicular to the wave crests. The device described in this patent is an efficient absorber but suffers from the lack of stable reference necessary for power extraction. Although the device incorporates several features that improve the efficiency of energy capture, the concept fails to incorporate the more important features necessary for economical wave energy generation efficiency.

A number of other mooring or anchoring means are disclosed in the prior art. See, for example, U.S. Pat. Nos. 4,408,454, 4,013,382, 3,879,950, 1,746,613, 917,411 and 855,258. The supporting structure or mooring system required to operate many of these inventions, however, is quite elaborate and costly. See, for example, U.S. Pat. Nos. 1,757,166, 3,879,950, 3,928,967, 4,013,382. A number of prior art patents disclose converting the captured wave energy into electrical energy. See for example, U.S. Pat. Nos. 4,152,895, 4,013,382, 3,879,950, 3,487,228, 1,962,047, 1,757,166 and 738,996.

The prior art is limited either to the mechanism by which power is transferred from wave to floating structure or to methods of converting the motion of a floating structure to useful power. The prior art does not make allowance for the random character of the incident waves by matching floating structure response to wave conditions that vary (1) annually for different locations around the world, (2) monthly (seasonal) fluctuations, and (3) over short intervals of time varying from fractions of an incident wave period to over several wave periods. Further, the prior art does not match the power train impedance to the incident wave characteristics so as to optimize power absorption and short time energy storage to achieve maximum power train efficiency.

The prior art does not analyze the economic factors that must be considered for an energy system to provide base load power to a shore installation. For example, the selection of deployment site includes factors such as bathymetry conditions for mooring and power transmission, distance from shore, matching onboard power generation to shore side power grid specifications, mooring depth, power collection from individual wave energy generating units, and power conditioning and transmission to shore.

It is an object of the present invention to overcome the deficiencies of the prior art and provide a wave driven power generation system which efficiently converts wave energy into electrical energy and which is cost effective to construct and maintain.

Other objects and advantages of the invention will appear from the following description.

SUMMARY OF THE INVENTION

The present invention is a system for converting wave energy into useful enegy and comprises an array having an arrangement of absorber units which are deployed offshore in a body of water. The units are arranged in a predetermined geometry so as to absorb and convert the incident wave energy in a physically and economically efficient manner. Each unit consists of one or more buoyant members or rafts. Each unit includes a hinged yoke which in turn is connected to a stabilized mooring structure. The unit may include a plurality of adjacent rafts which are hinged together so as to form an articulated chain or series of rafts. The mooring structure is sufficiently rigid to act as a stable reference to the motion of the floating raft. Hydraulic actuators are positioned between the hinged yoke and raft. Wave energy is absorbed by the hydraulic actuators which are responsive to the relative motion between the yoke and raft in such a way that the relative motion is employed to transfer energy to a hydraulic system. Both pitching and heaving motions of the floating raft are converted into useful power by connecting mechanical linkage, the hydraulic actuators, or direct electrical generators across the hinge between the raft and yoke and/or between the yoke and mooring structure. The hydraulic system drives motor generators that are located on each raft. The mechanical, hydraulic or electrical power is converted onboard the floating raft to a useful form of electrical power for transmission to a central transmission platform that is used as a collection point for the electricity generated by the units of the array. From this platform, the useful energy generated by the array is combined and transmitted to shore. Other forms of power, such as hydraulic or chemical power, can be transmitted in place of or in addition to electrical power.

The floating rafts are tuned to the frequency band of the incident waves prevalent to a particular geographic sea. The structural response of the rafts can be adjusted so as to coincide with the frequency spectrum of the incident waves whereby maximum power output can be provided for the existing sea conditions of that area.

The present invention has the following objectives and advantages:

1. The mooring structure is sufficiently rigid to resist the vertical forces of the wave activated floating structures, thus providing a stable reference platform for power removal.

2. The floating structures are designed to minimize reflected, transmitted, and self-generated waves thereby maximizing the power absorbed from ocean waves.

3. The floating structures employ the use of controlled mass, moment of inertia, and the geometrical shape of the hull to match the structure response to the spectrum of the incident waves, thereby maximizing power extraction efficiency.

4. The floating structures employ light weight structure for all elements that are not needed for holding ballast, machinery, or for sustaining high operating loads, thereby reducing capital cost.

5. A yoke is employed to connect the floating structure to the mooring structure, thereby reducing the loads on the mooring structure. The yoke serves as a member to activate the power extraction device. The power extraction device is actuated by relative motion between yoke and floating structure.

6. The power extraction device incorporates a control element that allows the power extraction impedance to be varied for maximum power extraction efficiency, thereby allowing maximum efficiency of power generation over short invervals of time.

7. Electrical onboard power generation capacity can be designed to provide optimum operating efficiency for a given average annual wave environment, thereby allowing maximum power conversion frequency for a given location.

8. Automatic sensing and control equipment are incorporated to isolate a part in the event of component failure or to allow modular shutdown for routine maintenance.

9. Those parts of the system that are subject to high wear and severe corrosion and loads can be replaced, thereby allowing maximum availability of power generating capacity and minimum operating and maintenance cost.

10. A unit can be disconnected from the mooring, control and power lines to allow transportation to shore for maintenance and repair. Further, a reserve unit can be installed to prevent loss of power capacity during drydocking or shore maintenance of wave energy units.

11. Power can be transmitted through the mooring system in a form that allows 360 degrees rotation of the array.

12. Power can be collected at a central control point to transform from onboard electrical generation levels to high voltage transmission over the longer distance to shore, thereby reducing line losses and increasing the economic efficiency of the system.

As a result of the unique features of the present invention, power systems may be installed by a user to meet variations in long term power demand through modular installation at great savings in invested capital. Still, the system, composed of a multiplicity of individual wave energy generating units, will produce power economically, competitive with conventional power sources.

BRIEF DESCRIPTION OF THE DRAWINGS

For a detailed description of a preferred embodiment of the invention, reference will now be made to the accompanying drawings wherein:

FIG. 3 is an elevation view of the preferred embodiment of the unit for the array of the power generation system of FIG. 1;

FIGS. 4A, 4B, 4C are views of the single raft unit:

4A is a plan view of the main deck of a typical single raft unit showing ballast tank arrangement.

Figure 1:
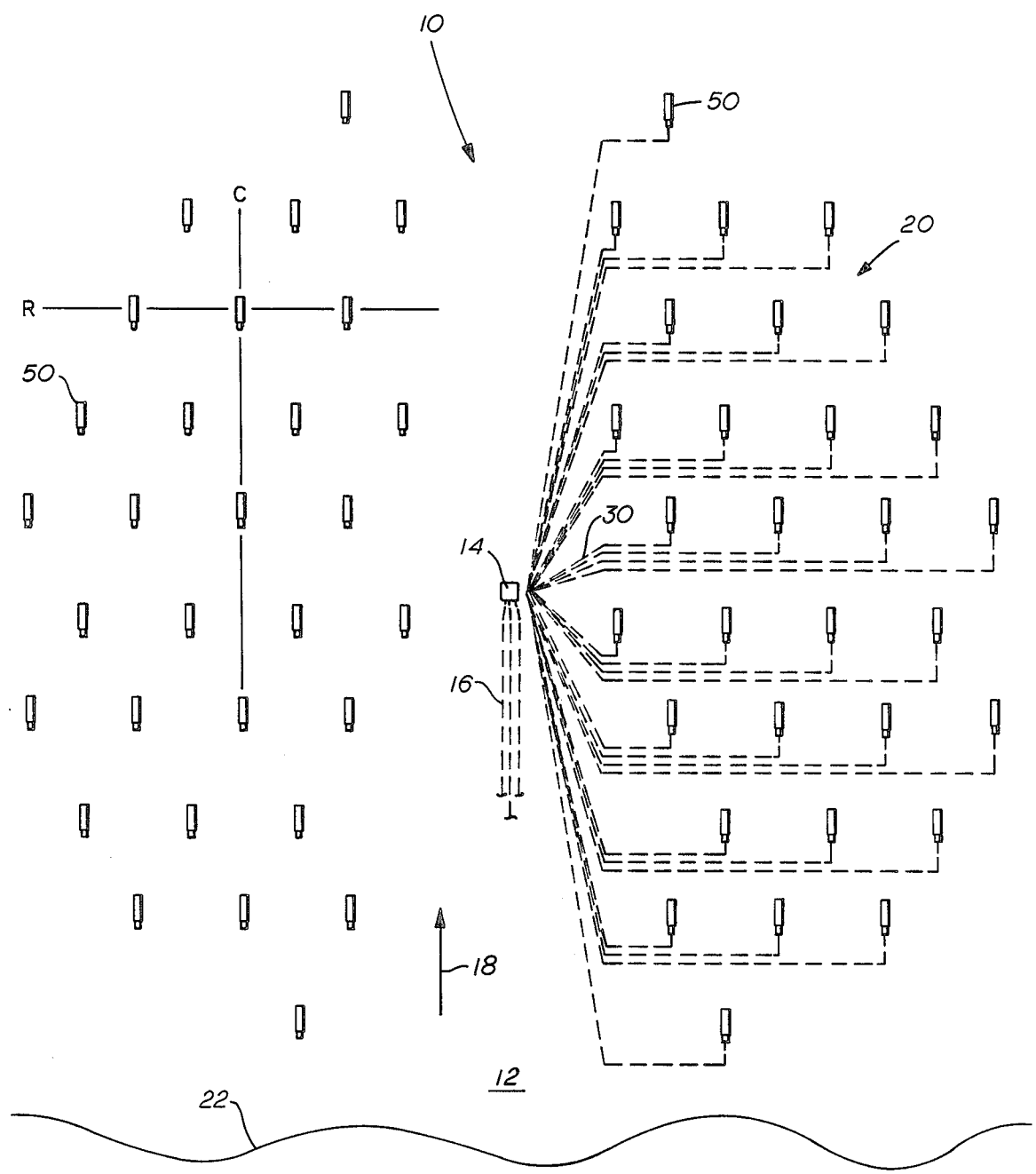
FIG. 1 is a plan view of the power generation system of the present invention comprising an array of units.
Figure 13:
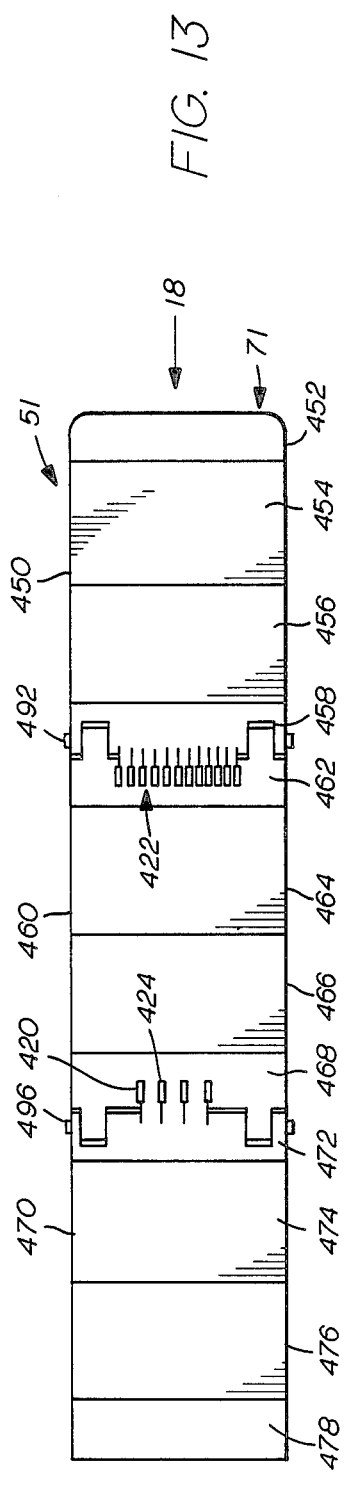
Figure 4A:
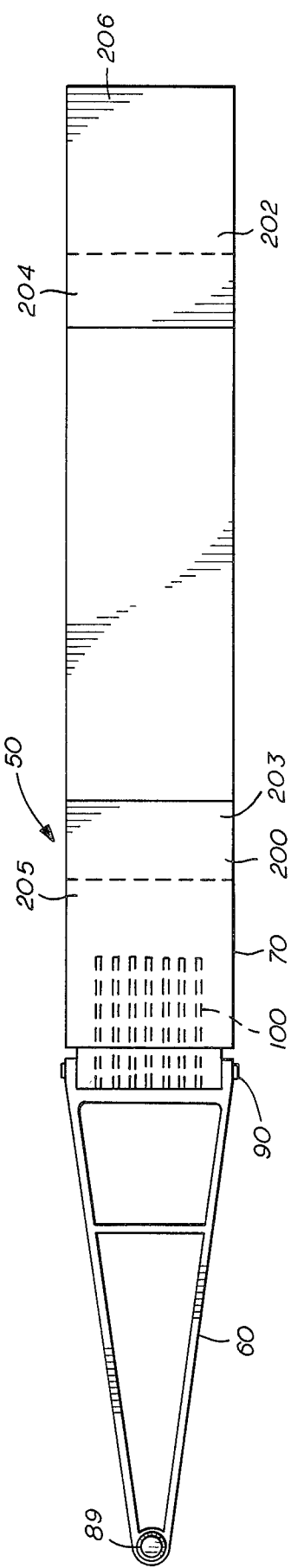
Figure 5:
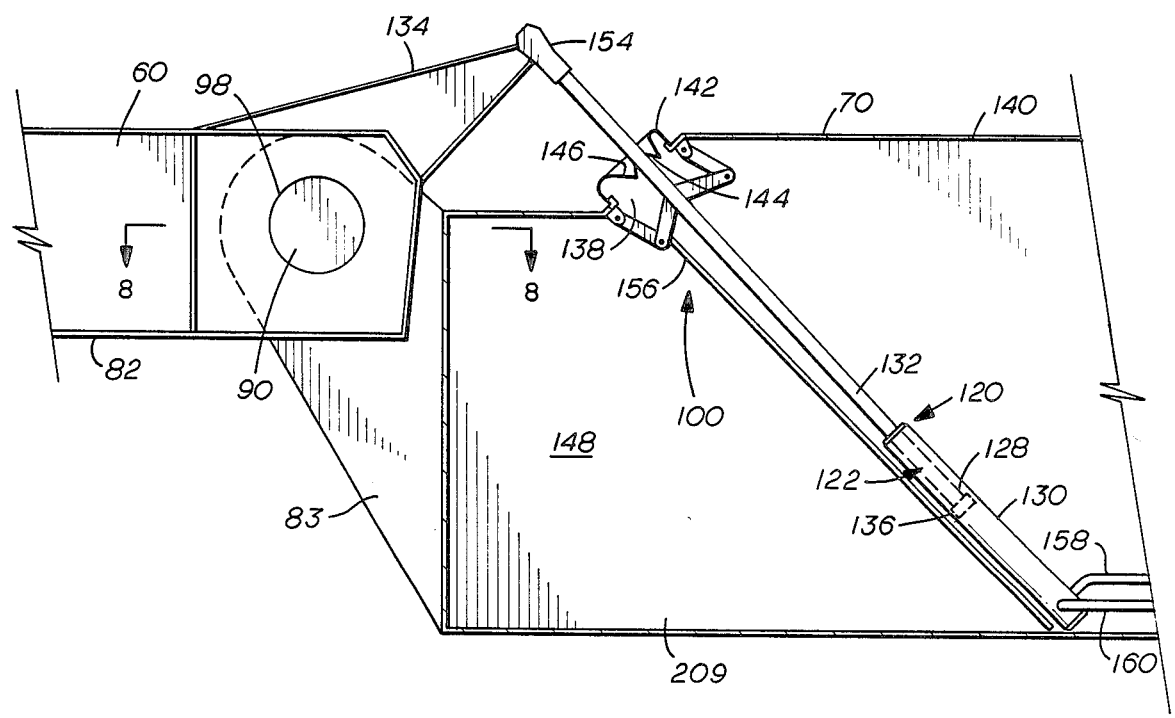
Figure 6:
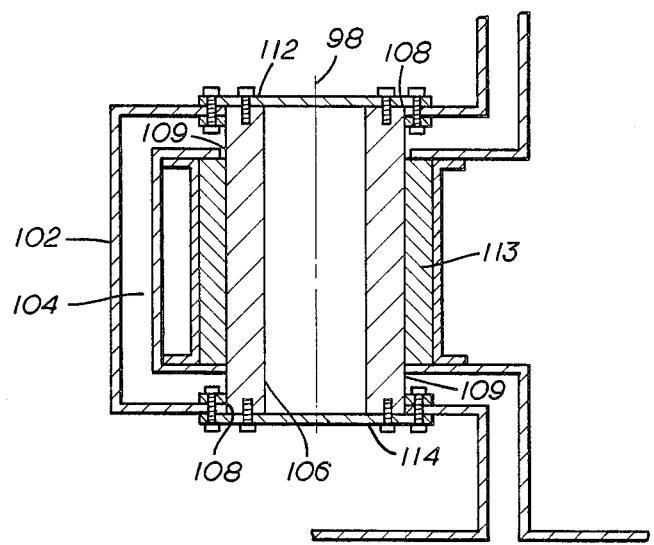
Figure 7:
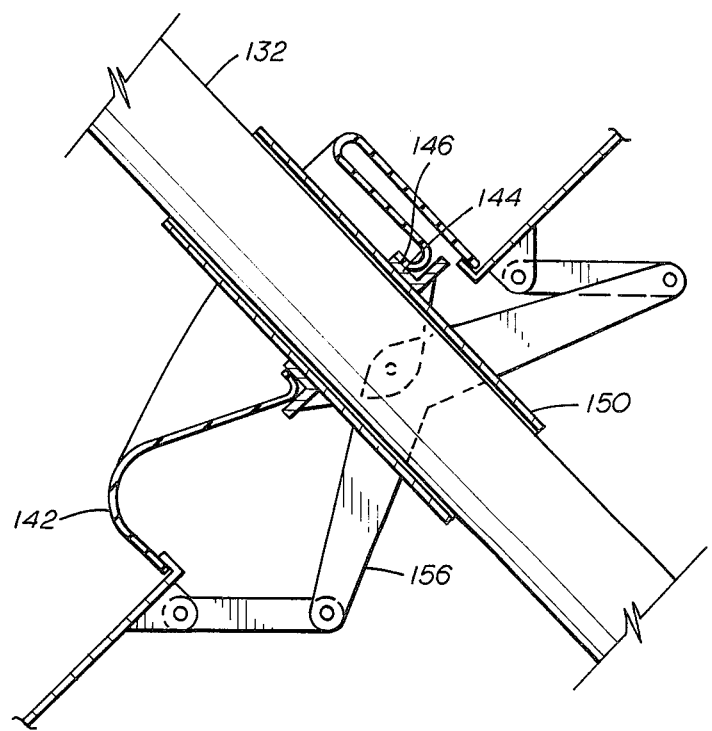
Figure 10:
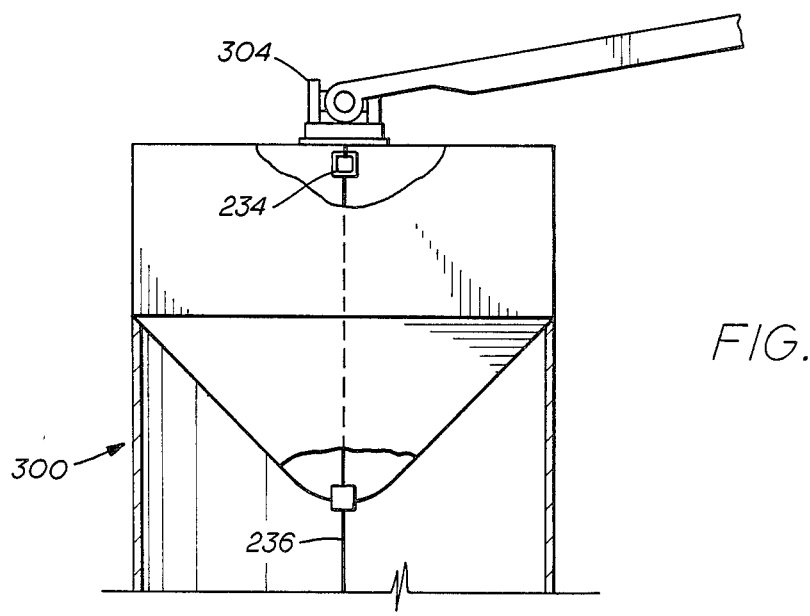
Figure 8:
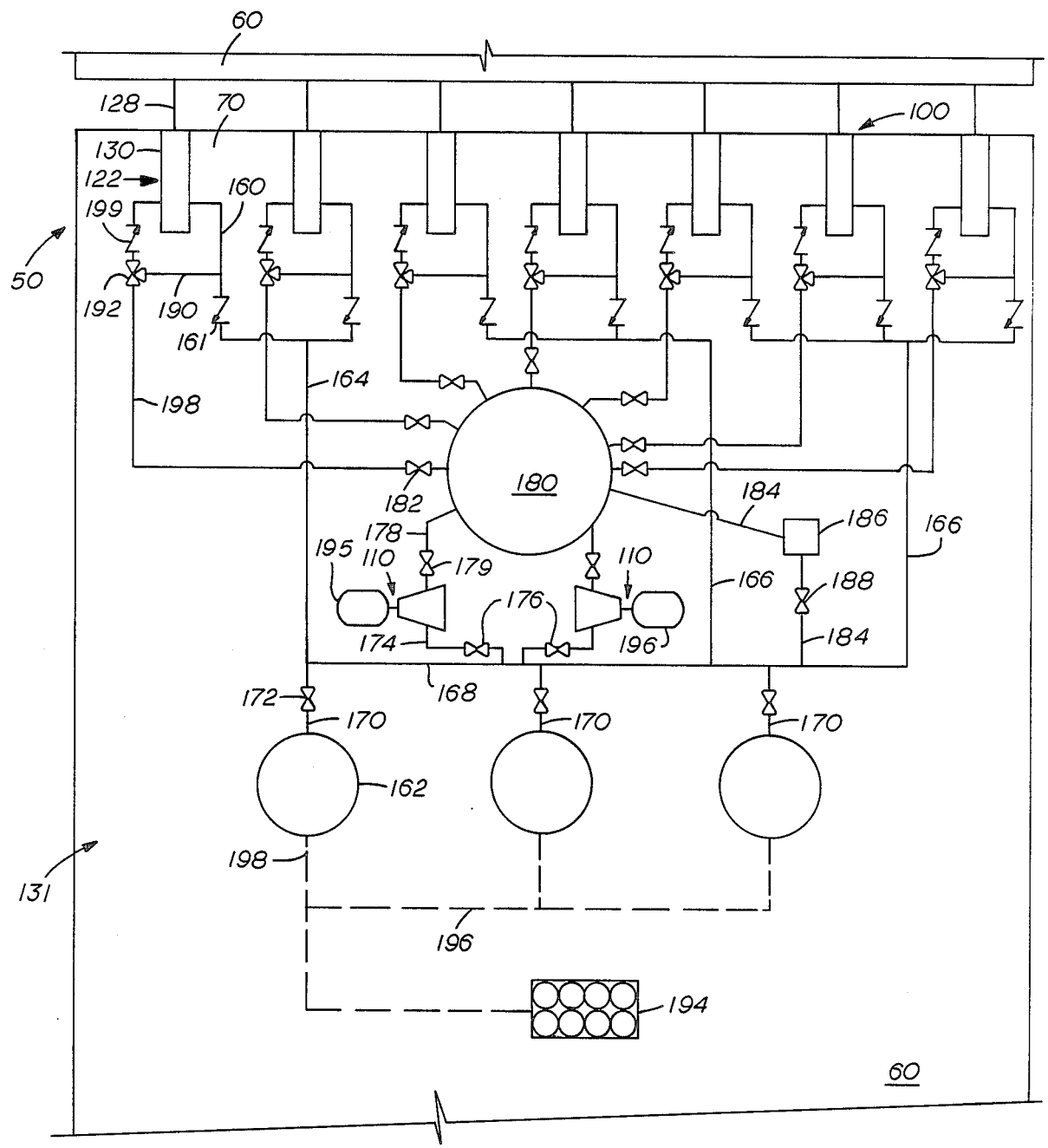
Figure 9:
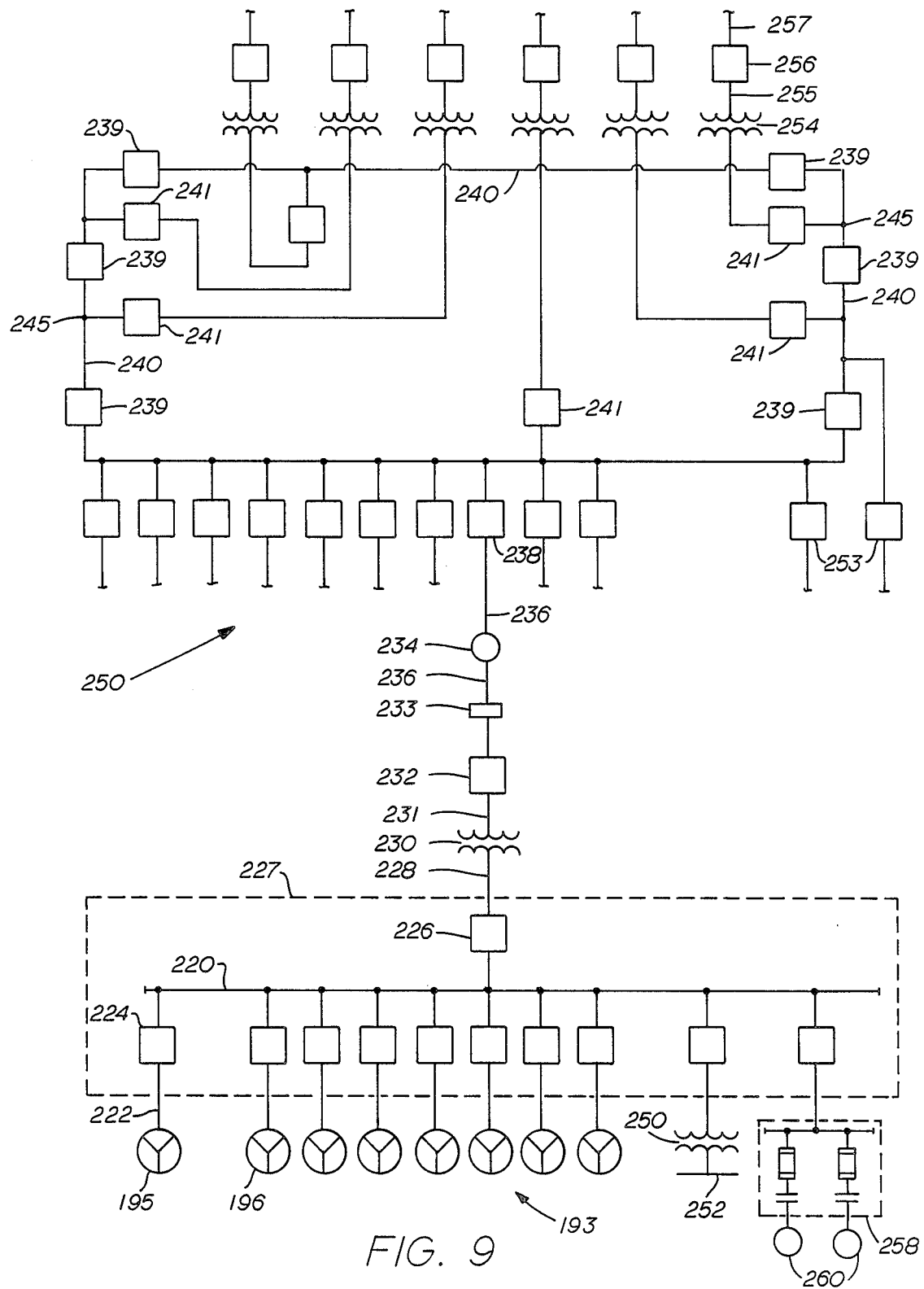
Figure 11:
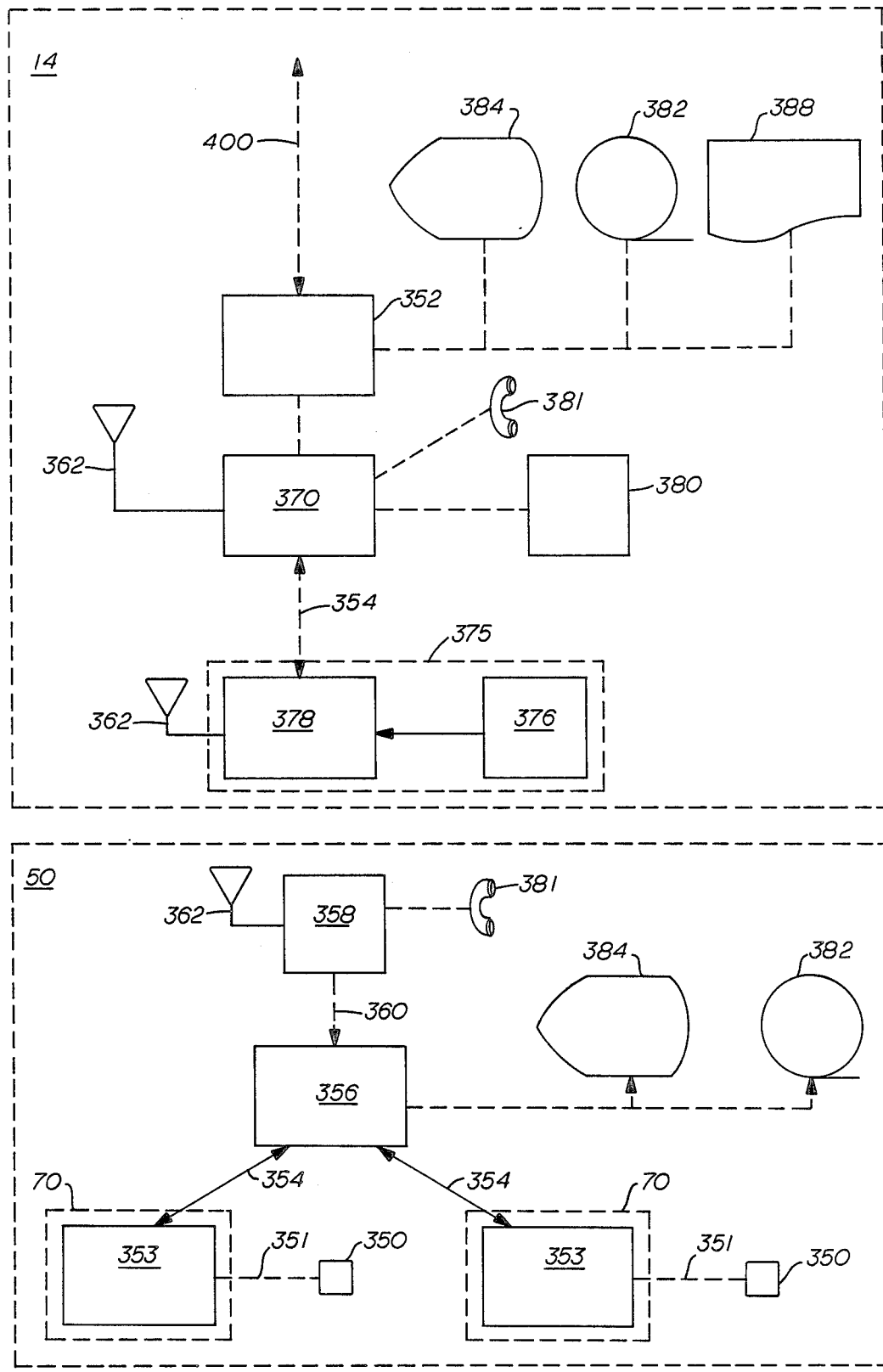
Figure 12:
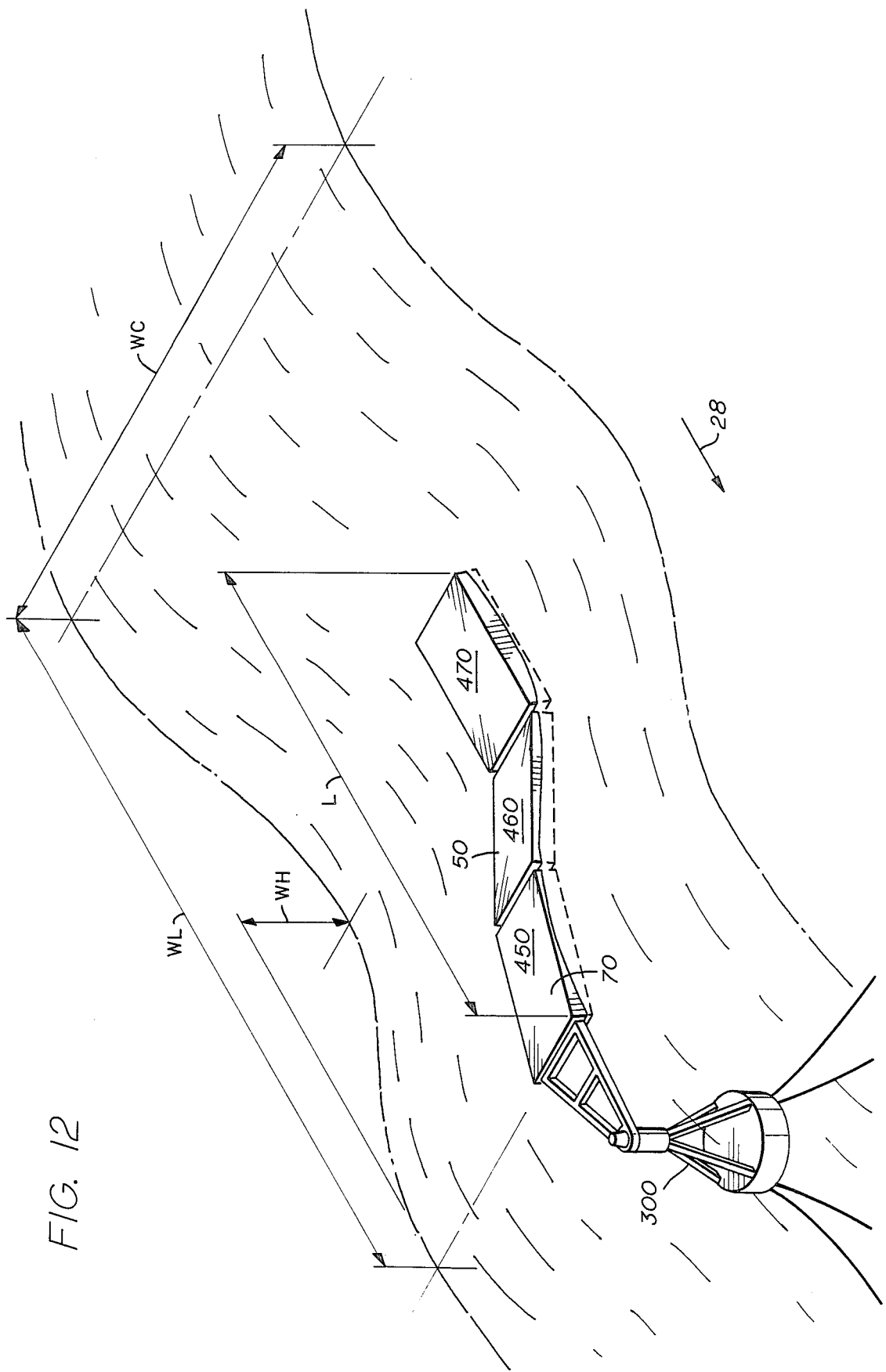
Figure 14:
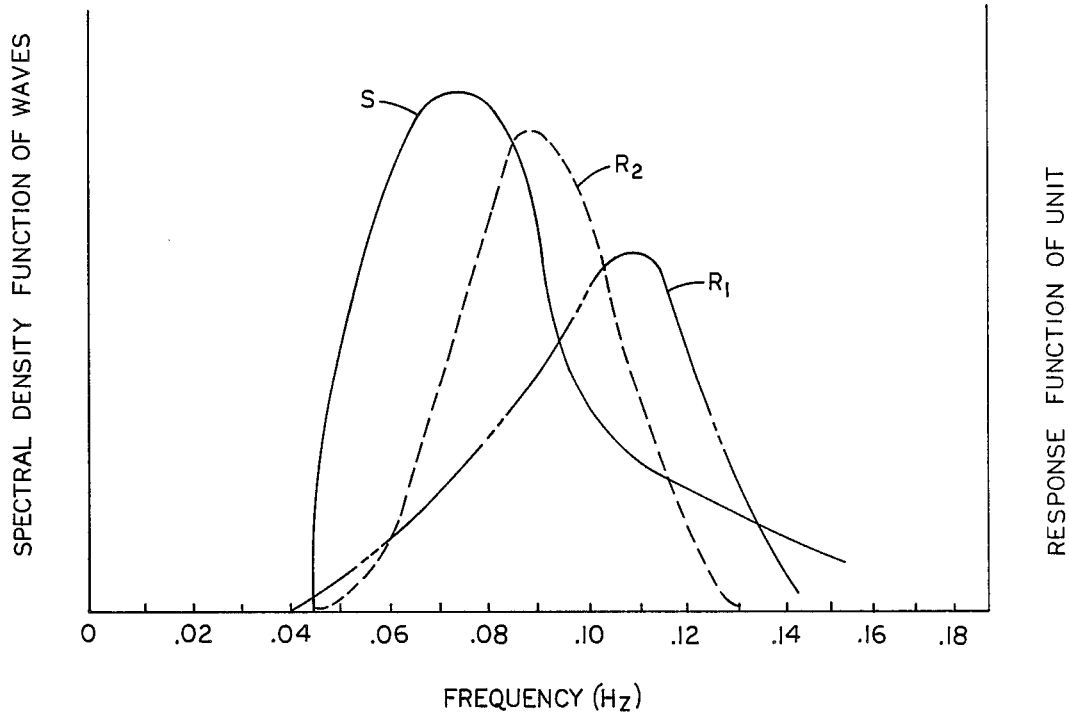
Figure 15:
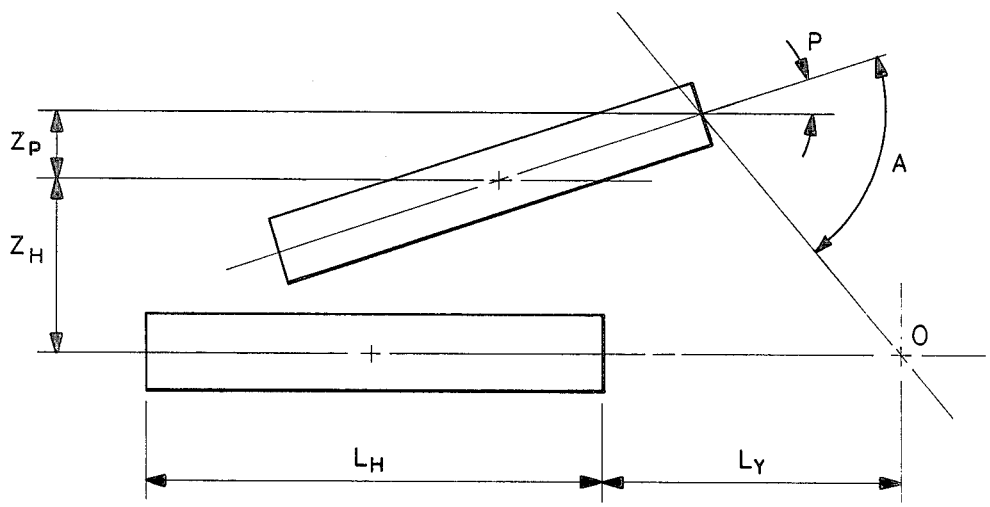
Figure 16:
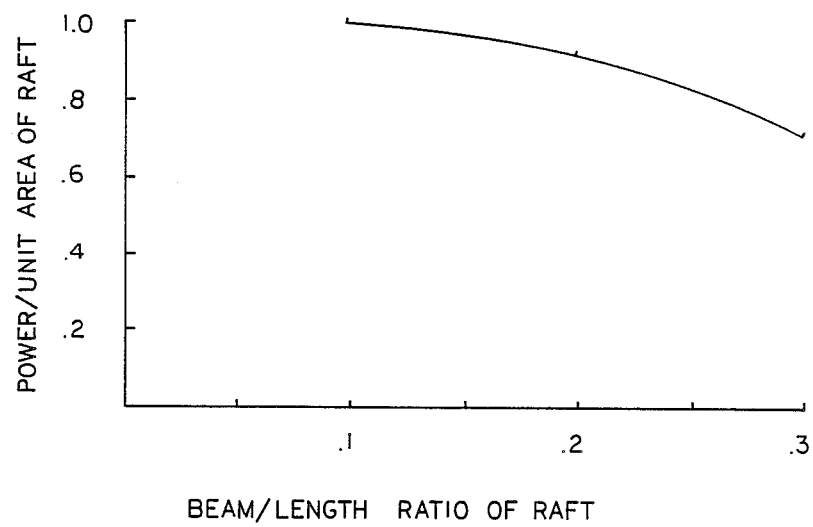
Figure 17:
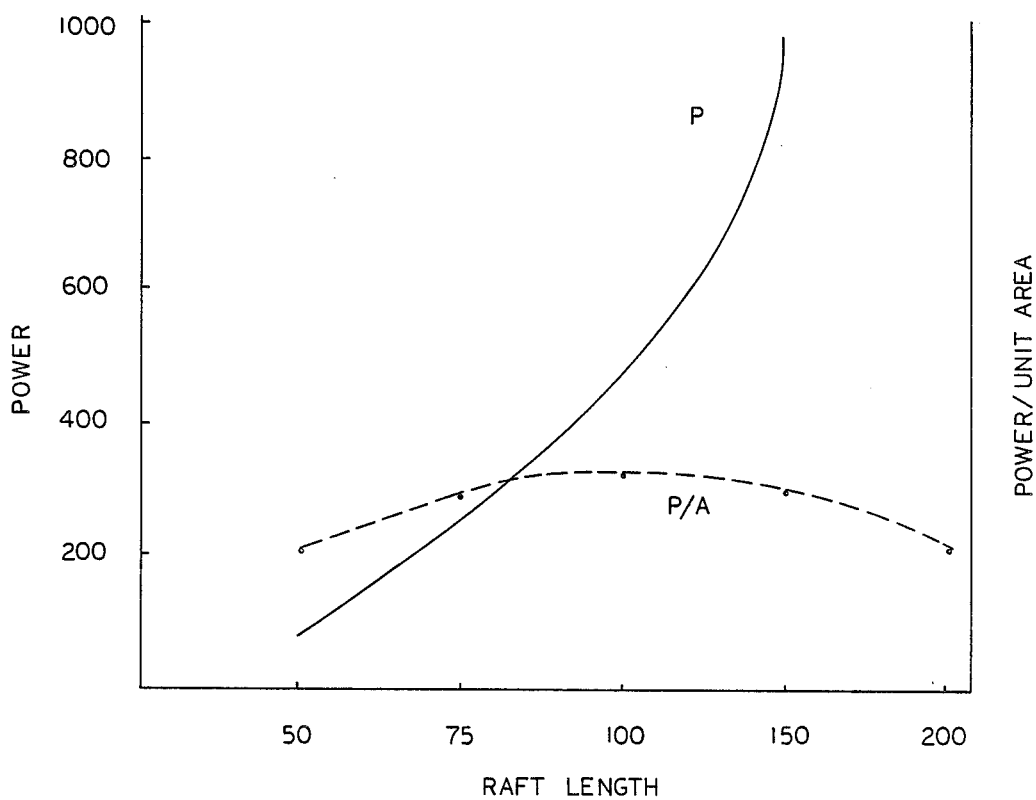
Figure 18:
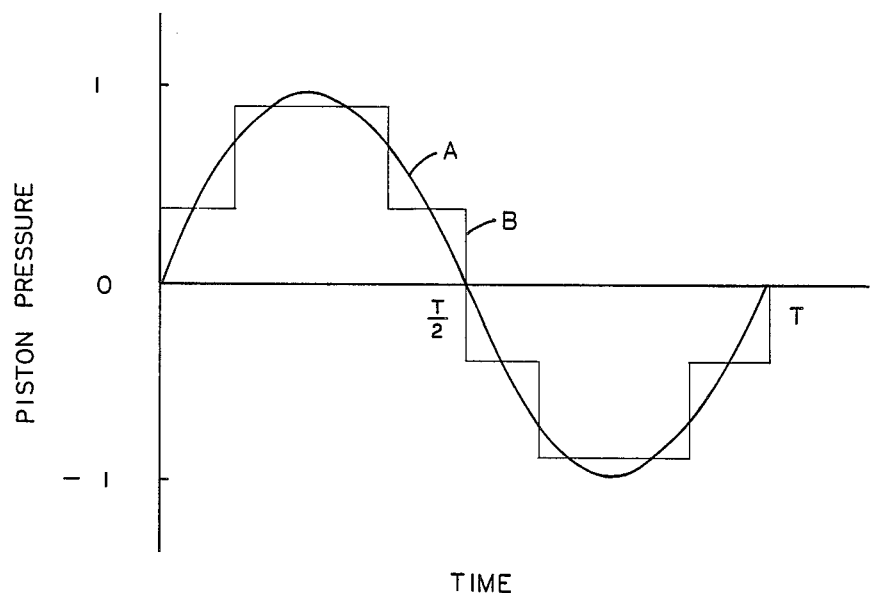
Figure 19:
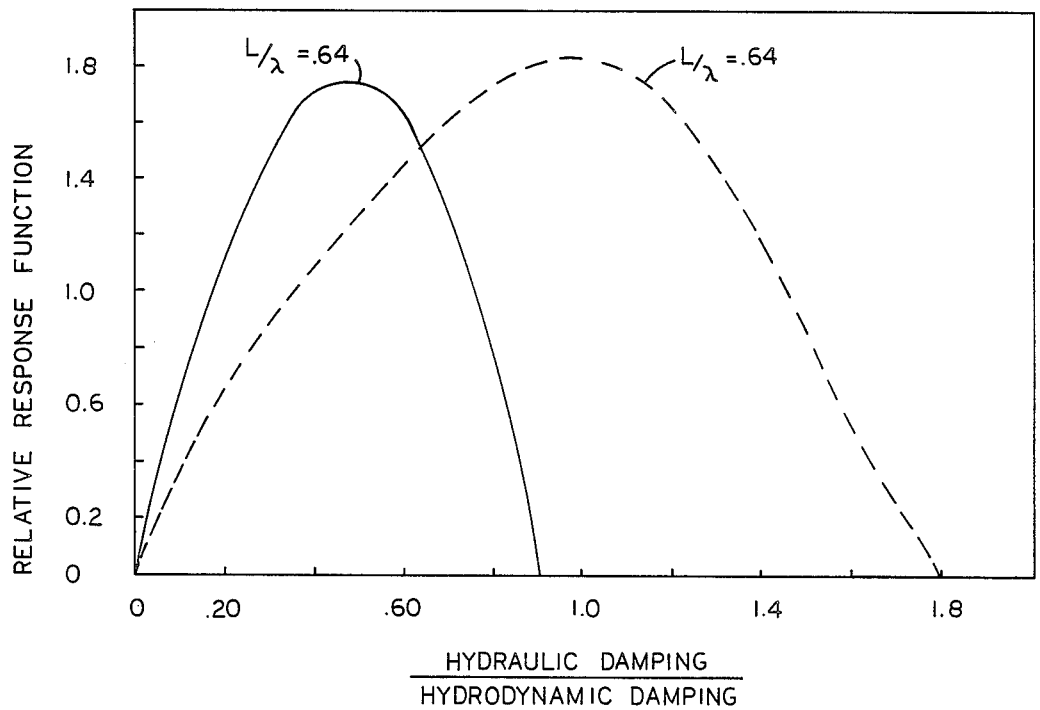
Figure 20:
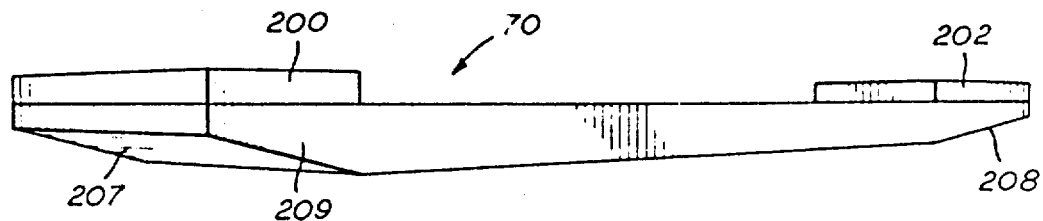
Figure 21:
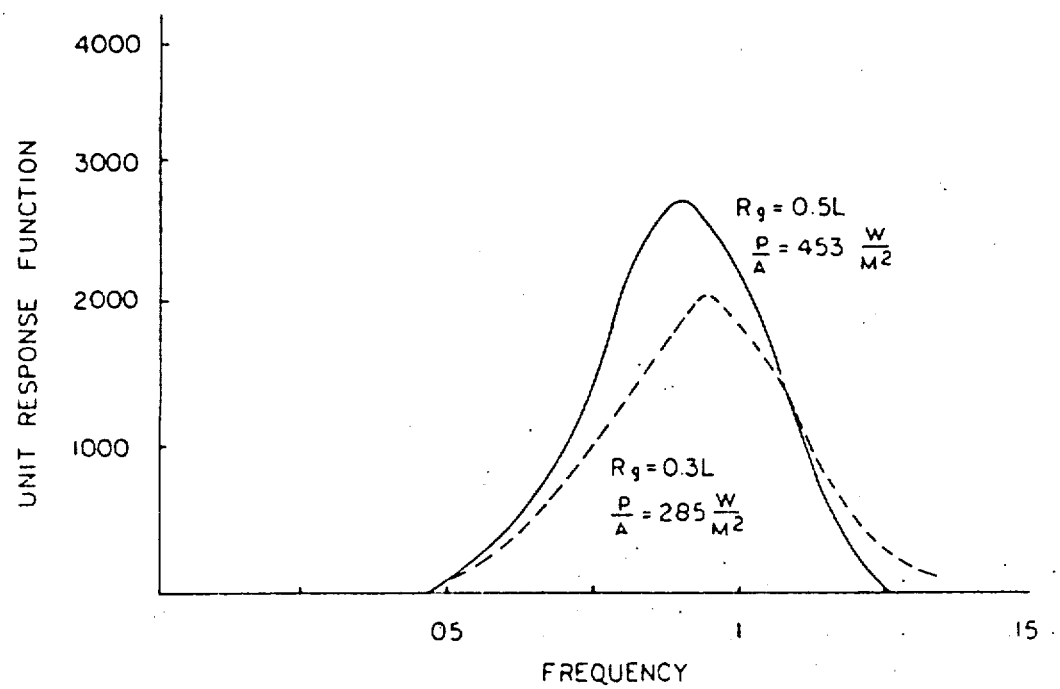

4B is a plan view below the deck of the single raft unit of FIG. 4A showing the arrangement of equipment for the unit, 4C is a longitudinal partial section view of the single raft unit of FIGS. 4A and 4B;

FIG. 5 is a partial section view taken of the hinge and hydraulic actuator between a yoke and an adjacent raft shown in FIG. 4;

FIG. 6 is a section view taken through plane 8—8 of the hinge of FIG. 5;

FIG. 7 is a section view of the protective seal of the hydraulic actuator of FIG. 5;

FIG. 8 is a schematic representation of the hydraulic circuits of the unit of FIG. 4;

FIG. 9 is a schematic representation of the electrical generation and transmission system for the system of FIG. 1;

FIG. 10 is a sectional view of the mooring buoy of the mooring system of FIG. 3;

FIG. 11 is a schematic representation of the control and communication system for the system of FIG. 1;

FIG. 12 is an isometric view of an alternative embodiment of a unit comprising a plurality of rafts in a wave field; and FIG. 13 is a plan view of the unit of FIG. 12;

FIG. 14 is a graph of the spectral density function of the wave field of FIG. 1 and graphs of the response functions of the unit of FIG. 3 and another unit with different physical parameters from that of FIG. 3;

FIG. 15 is a schematic of the angles of rotation of the yoke of the unit in FIG. 3 at a predetermined length;

FIG. 16 is a graph of the power per unit area of the raft of FIG. 3 at various beam to length ratios;

FIG. 17 is a graph of the power and power per unit area of the raft of FIG. 3 at various raft lengths;

FIG. 18 is a graph of the velocity proportional damping curve over one cycle of the hydraulic actuators for the unit of FIG. 3;

FIG. 19 is a graph of the damping of a single acting cylinder for the hydraulic actuator of the unit of FIG. 3;

FIG. 20 is a perspective view of the hull for the raft of the unit of FIG. 3; and FIG. 21 is a graph of two radii of gyration caused by the different loading of the raft of the unit of FIG. 3.

DESCRIPTION OF THE PREFERRED EMBODIMENT

Unit Deployment

Referring initially to FIGS. 1 and 3, the power generation system 10 of the resent invention includes an array 20 having a plurality of absorber units 50 positioned within a wave field 12 for extracting energy from the motion of the waves. Each absorber unit 50 includes one or more buoyant members such as floats or rafts 70 connected to a mooring means 300 by means of a mooring yoke 60 and allowed to move in response to the motion of the waves such as wave 22 in wave field 12. The extracted energy is converted onboard the raft 70 into useful energy such as electrical energy. The electrical energy is transported by transmission means 30 to a central platform 14 where the electrical energy from the array 20 comprising all the units 50 is collected for transmission by delivery means 16 to a land-based power grid (not shown).

As shown in FIG. 3, each unit 50 is moored to the ocean floor 32 by mooring means 300 hereinafter described in further detail with reference to FIGS. 3 and 10, and deployed about the central transmission platform 14 in a predetermined pattern or matrix. Referring again to FIG. 1, the matrix comprises an arrangement of 16 columns C and 10 rows R of units 50 with the longitudinal dimension of each unit pointed in the prevailing wave direction 18 of the wave field 12. The distance between the columns is approximately 2.0 times the length of unit 50, and the distance between adjacent rows is approximately 1.7 times the length of unit 50. In this manner, each unit is pointed in a substantially lineal direction opposite that of the prevailing wave direction and, except for the units in the front row of the matrix, each of the other units is obliquely rearward of a forward unit. As depicted in FIG. 1, the units 50 are deployed within a generally circular matrix having a predetermined radius so as to minimize the length of transmission means 30 and delivery means 16 in the power generation system 10. The radius of the array 20 of the preferred embodiment for the sea states is between 10 and 11 times the length of unit 50.

The row and column spacing permits each unit 50 to rotate or pivot about its mooring 300, while at the same time prevents collisions between the units. This configuration also allows service vessels to navigate between the units for maintenance and access to central transmission platform 14.

FIG. 1 illustrates the preferred deployment of the units 50 of array 20 for a location approximately 7 miles offshore near Stewart Island, New Zealand, where sea states generate approximately 70 to 80 kilowatts per meter in water depths ranging from 150 feet to 300 feet. Mooring depths less than 300 feet are desirable because of mooring system capital cost, installation, and maintenance costs. For sea states between 70 and 80 kilowatts per meter, array 20 includes 60 units 50, each generating a maximum of 1000 kilowatts of electricity. Electrical transmission lines 30 are laid on the ocean floor 32 to the distribution platform 14 to gather the electricity generated by each of the 60 units. The platform is a conventional offshore platform similar to the ones used in offshore oil and gas production. Electrical power at the Stewart Island, New Zealand site is transformed to 66,000 volts for transmission to shore through high voltage transmission lines 257, shown in FIG. 9, with low losses. Array 20 will generate a maximum of 60 megawatts of electricity and distribute approximately 180 gigawatt-hours of useful energy annually.

Figure 2:
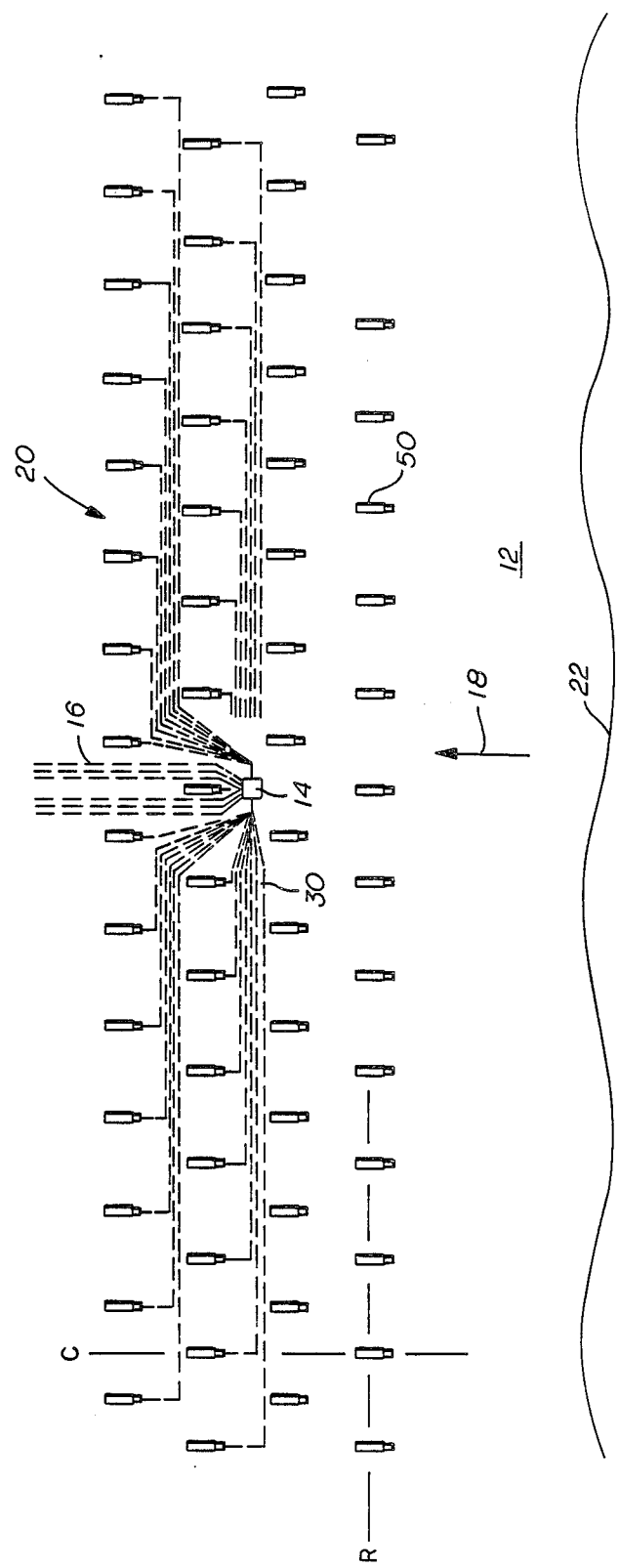
FIG. 2 is a plan view of an alternate embodiment of the power generation system of FIG. 1.

FIG. 2 illustrates an alternative deployment for sea states of approximately 70 to 80 kilowatts per meter using a rectangular pattern. The rectangular matrix of array 20 of FIG. 2 is composed of 4 rows R and 15 columns C of units 50. The columns are approximately 2.0 times the length of unit 50, and the distance between adjacent rows is 1.7 times the length of unit 50.

A wave power generator must operate efficiently in all conditions and produce power economically in order to be a competitive alternative to other types of power sources. In addition, in some cases, the wave power generator must produce power in sufficient quantities to form part of a base load system for larger power systems.

Array Layout

Referring now to FIGS. 3 and 4, power generation system 10 includes a unit 50, responsive to the heave and pitch motion of the waves, connected by connecting means 89 to mooring means 300 for holding unit 50 in a stable reference position while unit 50 moves in response to the motion of the waves. In the preferred embodiment, unit 50 includes a mooring yoke 60 hinged to a single raft 70, energy extracting means 100 responsive to the motion of the raft 70 relative to the yoke 60 for extracting energy from the heave and pitch motion of the waves, and conversion means 110 on raft 70 for converting the extracted energy into useful energy such as electricity.

FIGS. 4A, B, and C are schematics of the single wave power generator unit 50. The raft 70 is hinged to yoke 60 at 90 and yoke 60 is hinged by connecting means 89 to the mooring means 300, shown in FIG. 3. The mooring means 300 includes a large buoy 302 ballasted to represent a resistance to the vertical forces imposed on mooring means 300 by yoke 60. Across the hinge line 90 at the raft-yoke interface, conversion means 110 mounted on raft 70 and yoke 60 are driven by the relative motion between yoke 60 and raft 70. Conversion means 110 includes hydraulic actuators 120 which displace hydraulic fluid into accumulators 162 which are pressurized. Fluid from the accumulators 162 is conveyed to motor generators 193 where the motor generators are driven to produce electricity. Electrical power is produced at 3.3 KV by the generators and transformed to 11.0 KV in the transformer 230 for transmission through the cable 236 to the offshore platform 14.

In the preferred embodiment for sea states of approximately 70 to 80 kilowatts per meter as shown in FIG. 4, raft 70 of unit 50 has a beam of 15 meters and a length of 100 meters or a B/L (Beam to Length) ratio of 0.15. Yoke 60 has a length of 40 meters. The overall length of the yoke 60 and raft 70 is, therefore, 140 meters.

Referring now to FIG. 4A, raft 70 includes a bow and aft ballast section or compartment 200, 202, respectively. The ballast includes water and high density sand such as iron ore. Therefore, compartments 200, 202 includes water-tight sections 203, 204 for containing the water. The aft ballast compartment 202 includes compartment 204 for water and compartment 206 to store sand. The bow ballast compartment 200 includes compartment 203 for water and compartment 205 to store sand. The water is baffled in compartment 203, 204 to avoid shifting water during operation. Water levels in compartments 203, 204 may be adjusted to alter the moment of inertia of raft 70. The bow and aft compartments 200, 202 may not be symetrically loaded. Compartments 200, 202 extend above deck 140 and over the waterplane line of hull 209 to enhance the movement of inertia. Ballast is provided in the raft in order to allow optimization of the moment of inertia about the center of rotation of raft 70 and thus enhance the responsive motion of unit 50 to wave 22.

The molded depth of the hull 209 of the raft 70 is five meters, and the deck of raft 70 is in ten foot sections to take advantage of the standard lengths of the steel plate. Raft 70 is designed for a draft of 3 meters with a two meter freeboard. The hull 209 of raft 70 has a preferred shape as shown in FIG. 20. The hull 209 has a sloped or rake bow and stern at 207, 208 respectively to reduce the drag of water due to the velocity of the hull and to avoid loss of energy by making waves. The slope of the bow and stern is shown to be identical. The bow and stern have been raked to increase the deck length so that the deck 140 is longer than the hull 209 at the waterline. This causes an increase in the ratio of moment of inertia to the pitching moment.

Array Hinges

Connecting means 90 for joining raft 70 to yoke 60 includes a hinge 98 illustrated in FIGS. 5 and 6. Yoke 60 and raft 70 are hinged together so as to allow relative movement therebetween about the hinge line of hinge 98. Hinge 98 includes a female or U portion 102, a male or eye portion 104, and a pin 106. The structural frame 82 of yoke 60 forms the female portion 102 of the hinge 98 and the structural frame 83 of raft 70 forms the male portion 104 of hinge 98. The female portion 102 of hinge 98 receives the male portion 104. Female and male portions 102, 104 include aligned apertures 108, 109 for receiving the pin 106. The entire hinge is enclosed so as to be isolated from the corrosive environment. Seal plates 112, 114 are affixed over the open ends of aperture 108 to prevent water from entering the hinge 98. While FIG. 6 shows the pin 106 to be supported by roller bearings 113, a suitable journal bearing could also be used. It should be clearly understood that other embodiments of the hinge 98 could be used such as extending pin 106 through the full beam 83 of the raft 70.

Hydraulics

Referring now to FIGS. 5 and 8, the energy extracting means 100 includes a plurality of hydraulic actuators 120. Hydraulic actuators 120 are mounted across the connecting means 90 to displace hydraulic fluid in response to the relative movement between the raft 70 and yoke 60. The displaced hydraulic fluid from the hydraulic actuators 120 is accumulated in the hydraulic system 130 for conversion to electrical energy by the conversion means 110.

Referring again to FIG. 4B, hydraulic actuators 120 include a set of hydraulic pistons and cylinders 122 spanning across connecting means 90. The individual hydraulic actuator sets act in concert with the others.

FIG. 5 depicts a typical hydraulic piston and cylinder that converts the relative rotational movement of yoke 60 and raft 70 into hydraulic energy. The set of hydraulic pistons and cylinders 122 are the same and can be any one of a number of commercially available hydraulic pistons and cylinders. As shown, each hydraulic actuator 120 includes a piston 128 and cylinder 130. Piston 128 has a connecting rod 132 connected at its uppermost end to yoke 60 by cross members 134. The head 136 of piston 128 is received within the cylinder 130 which is mounted below the deck 140 of raft 70. Referring to FIG. 8, a system of valves 192 and piping 190 is used to control the back pressure in the cylinder 130 to optimize power generation impedance, described in further detail hereinafter.

Referring now to FIGS. 5 and 7, the connecting rod 132 passes through an aperture 138 in the deck 140. Rod 132 has mounted thereon a Teflon sleeve 150, which slides along the rod 132 as the piston 128 reciprocates in response to the rotational movement of the uppermost end of rod 132 about point 154 where it is affixed to cross member 134 of yoke 60. Rod 132 cannot be longer than the stroke of piston 128. Normally, the stroke is short. A clutch may be installed in rod 132 to disconnect rod 132 where an abnormal stroke length is encountered due to high seas. A seal carrier 144 with seal 146 is slidably disposed around Teflon sleeve 150 and in sealing engagement therewith. A flexible molded boot 142 closes the aperture 138 around connecting rod 132 and is attached to the seal collar 144. Boot 142 flexes as seal carrier 144 reciprocates on sleeve 150 and acts in concert with the Teflon seal collar or carrier 144 and seal 146 to prevent the entrance of rain or sea water into the hold 148 of raft 70. Connecting linkages 156 support connecting rod 132 and allow rotational or angular movement of piston 128.

Cylinder 130 mounted below deck 140 of raft 70 includes inlet and outlet conduits 158, 160, respectively for pumping the hydraulic fluid into and out of the cylinder 130.

Referring now to FIG. 8, there is shown a schematic representation of the hydraulic system 131 for unit 50. As depicted in FIG. 8, the set of hydraulic pistons and cylinders 122 include seven identical pistons and cylinders located between raft 70 and yoke 60 which communicate with the accumulator 162 used to drive conversion means 110. The use of identical types and sizes of equipment facilitates maintenance and lowers the system's cost.

The relative motion of raft 70 and yoke 60 will cause each piston 128 to displace the hydraulic fluid in its cylinder 130, forcing the hydraulic fluid to flow out of cylinder 130 through outlet conduit 160 and check valve 161 and into the associated actuator main 164. A separate actuator main 164 is provided for each of the three sets of pistons and cylinders 122. Outlet conduits 160 and actuator means 164 are all constructed for 4 inch conduit.

The actuator main 164 is in fluid communication with accumulator 162, accumulator main 168, and conversion means 110 by means of feeder conduits 166, accumulator conduits 170, motor intake conduit 174, and accumulator valves 172 and motor intake valves 176. Feeder conduits 166, accumulator main 168, accumulator conduits 170, and motor intake conduits 174 are all constructed of 8 inch conduit. With actuator mains 164 being in fluid communication with accumulators 162, accumulator mains 168 and motor intake conduits 174, the hydraulic fluid that is pumped from cylinder 130 forces hydraulic fluid into the intake ports of conversion means 110 through intake conduits 174.

The accumulator and associated valves control the pressure in the hydraulic actuator 120. For maximum efficiency, the actuator pressure should be proportional to the velocity of motion of the actuator piston as will be discussed in further detail hereinafter. For practical engineering purposes, the velocity proportional pressure is approximated.

After the hydraulic energy has been converted into electrical energy by conversion means 110 and the hydraulic fluid is discharged from conversion means 110, it flows into reservoir/heat exchanger tank 180 through motor discharge conduits 178 and discharge valves 179. Reservoir/heat exchanger tank 180 is a tank 15 feet in diameter and 5 feet high. It serves both as a heat exchanger, which dissipates the heat that is generated as the hydraulic fluid is displaced in cylinders 130, and as a fluid reservoir, from which hydraulic fluid is drawn into cylinders 130, which is in fluid communication with heat exchanger 180 through intake conduit 198, intake check valve 199, and cylinder intake valve 182. Intake conduit 198 is constructed from 5 inch schedule 40 conduit.

A motor operated 3-way bypass valve 192 is located between cylinder intake conduit 198 and cylinder outlet conduit 160. Operation of bypass valve 192 isolates cylinder 130 from the hydraulic system 131 permitting maintenance to be performed on cylinder 130. Suitable pressure relief and system control features will be incorporated to provide a safe, functioning system.

Raft Electrical

The energy conversion means 110 includes eight to ten 12 CIR hydraulic motor generators 193 depending upon motor size, only two of which are shown in FIG. 8, i.e. generators 195, 196. The flow of hydraulic fluid into the motor generators 193 turns its associated motor shaft which, in turn, causes the associated generator to rotate and generate electricity. As shown in FIG. 9, the hydraulic motor generators 193 are connected in parallel to bus 220 by means of generator conductor 222. This arrangement allows one or more motor generators 193 to be brought on or off line as the incident available wave energy increases or decreases.

The hydraulic motors of motor generators 193 may be of the variable displacement type with pressure compensated control but may be turbines of the "Pelton wheel" type. This type of turbine is characterized by its ability to maintain synchronous rpm so long as the pressure at its input nozzle is constant, but it can accommodate a widely varying flow rate by varying the orifice size of its nozzle. Accumulators 162 have the function and effect of smoothing out the surges of hydraulic fluid which are discharged from hydraulic cylinder 130. Even with a large number of such cylinders 130, it was experimentally determined that the hydraulic fluid pressure generated in response to the movement of the rafts fluctuated, and thus not well suited to operating a Pelton wheel type of turbine which, as described above, is designed to function under constant hydraulic pressure. If a turbine is used, in order to insure that a constant head of pressure is available at the conversion means 110, a bottled nitrogen gas tank 194 shown in FIG. 8 may be employed in order to maintain a constant head of pressure in the accumulator 162 of approximately 3000 psi. It is understood that air compressors could be employed to serve the same function as the bottled nitrogen gas tank 194 if the pressurizing gas and hydraulic fluid are isolated from each other. Accumulator 162 is a spherical pressure vessel with a volume of 132 cubic feet. Should the pressure available to drive the motor generators 193 shown on FIG. 8 become too great, pressure relief valve 186, in fluid communication with accumulator main 168 through valve 188, will open and release hydraulic fluid into heat exchanger tank 180 through conduit 184, thus alleviating the over pressure situation.

Electrical power can be generated on board the raft 70 as either AC or DC power. The selection of the mode depends upon transmission distance to shore and whether or not electrical energy is to be stored such as in batteries.

Referring again to FIG. 9, in the AC mode of generation electrical power is generated by generators 193 at 3.3 KV, 50 HZ or 60 HZ and flows through generator conductor 222 and generator circuit breaker 224, thus energizing bus 220. Generator circuit breaker 224 may be operated remotely and automatically in response to a change in the wave conditions, or can be operated manually, so as to disconnect a motor generator from energized bus 220. Also shown connected to bus 220 is auxiliary power transformer 250, a 3-phase, 50 HZ or 60 HZ, 300 KVA transformer with a 3.3 KV primary and a 400-Volt secondary, which provides electrical energy to a motor control center 252 used to power and control the operation of miscellaneous motors and shipboard equipment. If air compressors are employed instead of the bottled nitrogen gas tanks 194, the air compressors 260 can be fed from a 5 KV motor control center 258 which is energized from bus 220 as well.

From bus 220, electrical energy is transmitted to array transformer 230 through array primary circuit breaker 226 by means of array primary conductor 228. Array transformer 230 is a 3-phase, 50 HZ or 60 HZ, 1000 KV transformer with a 3.3 KV primary and an 11 KV secondary. Generator circuit breakers 224 and the array primary circuit breaker 226 are 3-phase, 50 HZ or 60 HZ, 5 KV vacuum circuit breakers and are arranged and housed in a line-up of metal clad switchgear 227, located in raft 70 as best shown in FIG. 4B.

After being transformed to 11 KV, the electrical energy is transmitted from transformer 230 to the electrical distribution system 250 of central platform 14. The electrical energy is transmitted to the 11 KV ring bus 240 of system 250 through secondary conductor 231, array secondary circuit breaker 232, transformer termination chamber 233, slip ring 234, submarine transmission cable 236, and ring bus circuit breaker 238. As shown in FIG. 9, the opening of either ring bus circuit breaker 238, secondary circuit breaker 232, or array primary circuit breaker 226 will electrically isolate unit 50 from platform 14 as no electrical energy can be transmitted through the open circuit. Secondary circuit breaker 232 is a 3-phase, 50 HZ or 60 HZ, 11 KV vacuum circuit breaker and is physically positioned near the transformer termination chamber 233. Transformer termination chamber 233 serves both as a fixed termination point for secondary conductor 231 and submarine transmission cable 236, and as the transition point where the different types of conductors may be electrically joined. As explained more fully in the following paragraphs, slip ring 234 serves as an electrical connection that allows unit 50 to pivot about its mooring means 300 without twisting or damaging the submarine transmission cable 236 best shown in FIG. 3.

Also located in raft 70 is battery room 235. Batteries and other typical shipboard equipment and power supplies (not shown) also are required. Such shipboard equipment might be a diesel generator used to operate navigational lighting and communication equipment when the unit 50 is not generating its own electricity.

As shown further in FIG. 4B, the conversion and generation equipment is located below decks in raft 70 in order to protect the equipment from the elements and thus prolong the life of the equipment.

Mooring System

Referring now to FIGS. 3 and 10, each unit 50 must be moored to the ocean floor 32 so as to provide a stable reference platform for unit 50 and to maintain its relative position within the deployment matrix with its longitudinal dimension parallel to the prevailing wave direction 18, while, at the same time, allowing each unit 50 freedom of movement in order to pivot in accordance with any change in the resultant force vector due to current, angular reflected waves, wind or change in prevailing wind direction. Accordingly, as shown in FIG. 10, each unit 50 is moored to the mooring means 300 by mooring yoke 60. The resonant frequency of the buoy 302 is reduced by means of added ballast to prevent large motions of the buoy 302 in response to the vertical forces imposed by raft 70 through yoke 60. The end of the mooring yoke 60 opposite the end attached to raft 70 is attached to mooring means 300 by connecting means 89 which includes a mooring swivel 304 mounted atop the mooring means 300. The mooring swivel 304 allows the unit 50 to swing and pivot 360 degrees in accordance with the change of prevailing wind or wave direction. The mooring means 300 is held relative to the ocean floor 32 by buoy chains 306 and anchors 308.

Transmission means 30 includes the electrical cable 236 electrically connecting each unit 50 to the central transmission platform 14, which serves as an accumulation point for the energy generated at each unit. The cable 236 passes through the mooring swivel 304 to the ocean floor 32. A slight loop 312 is created in the cable 236 below unit 50 by an external buoy 314 so as to prevent the cable 236 from becoming entangled in the mooring chains 306 and anchors 308 or from being damaged from dragging along the bottom.

Referring now to FIG. 10, allowing unit 50 to swing 360 degrees requires an electrical slip ring 234 in order to electrically tie each unit 50 to the transmission means 30.

Electrical System

Referring again to FIG. 9, there is shown a schematic representation of the electrical distribution system 250. As previously explained, the electrical energy generated by each unit 50 is transmitted from unit 50 to ring bus 240 of central platform 14 via submarine transmission cable 236. While FIG. 9 only shows one such transmission circuit connecting a unit to the ring bus 240, it is understood that each unit 50 of the array 20 of power generation system 10 is electrically tied to the ring bus 240 in a similar manner. Electrical energy generated on unit 50 flows through the ring bus circuit breaker 238, energizing ring bus 240. Transmission transformers 254 are electrically connected to ring bus 240 through primary feeder breakers 241. Transmission transformers 254 are 3-phase, 50 HZ or 60 HZ, 40 MVA transformers with an 11 KV primary and a 66 KV secondary and serve to step up the voltage level to 66 KV for transmission to shore. Connecting the segments or ring bus 240 are the breakers 239. Tie breakers 239, ring bus circuit breaker 238, and primary feeder breakers 241 are all 11 KV vacuum circuit breakers and, during normal operation, would all be in the closed position. In this manner, ring bus 240 would be a completely energized ring. Transmission transformers 254, which are electrically tied to ring bus 240 between tie breakers 239 at locations 245, would in turn be energized through primary feeder breakers 241. Electrical energy flowing from ring bus 240 through transmission transformers 254 would be stepped-up in voltage to 66 KV and transmitted to the onshore power grid (not shown) through transmission feeder breaker 256 via submarine transmission means 16 shown in FIG. 1. Transmission feeder breakers 256 are SF6 type and rate 66 KV. When it becomes necessary to disconnect any one of the transmission transformers 254 from service, to perform periodic maintenance for example, primary feeder breaker 241 is opened. This completely isolates the disconnected transmission transformer 254 from the 11 KV ring bus 240, but does not disrupt the flow of electrical energy to any of the other transmission transformers 254.

Electrical energy will also be required for operations on platform 14. Therefore, platform breakers 253 are shown in FIG. 9 through which platform transformers (not shown) can be energized and used to provide all the electrical power needed on platform 14.

Control and Communication System

Referring to FIG. 11, there is shown a block diagram of the control and communication system for the unit 50 and platform 14 of wave driven generation system 10 described herein. Various sensors and control devices 350 are located in each unit 50. A multituide of parameters and variables must be sensed and transmitted to the central platform master control unit 352 on the platform 14 in order to be able to monitor all the equipment located on each unit. The status of the equipment, such as the hydraulic actuators 120, the connecting means 90, the accumulator 162, the motor generators 193 and all the electrical equipment must all be monitored. Status will be monitored at sensor 350 which will generate an electrical signal that is transmitted to the local control unit 353, located on raft 70, via signal means 351. A dual fiber optic system 354 will be employed to transmit data between the local control units 353 of raft 70 to a central unit control station 356. From this central array control station 356, the data will be communicated to a unit communication station 358 by a second dual fiber optic system 360, where the data is then transmitted via microwave link 362 to the central platform telecommunication unit 370, which then transmits this data to the central platform master control station 352. If any abnormal condition is sensed, signals will be transmitted from the central platform master control station 352 to the central unit control unit 356, via central platform telecommunication unit 370, microwave link 362, and communication unit 358. The central unit control station 356 will then send the signal via fiber optic system 354 to the proper local control unit 353 which will disconnect the troubled equipment by sending the appropriate signal to sensor on controller 350 via signal means 351.

Additionally, monitoring buoys 375 will be placed in the water in various locations near or within the array deployment site so as to monitor wave conditions. The monitoring buoys 375 will contain a measuring unit 376 and a telecommunication unit 378. The information obtained by measuring unit 376 will then be transmitted to the central platform telecommunications unit 370 by way of dual fiber optic submarine cables 354. This information is again transmitted to the central platform master control unit 352. If a change in a controllable raft or unit parameter is in order, the appropriate signal is then transmitted from the central platform master control station 352 to the appropriate central unit control stations 356 via microwave link 362, central platform telecommunication unit 370, and unit communication unit 358. A controlling signal will then be sent via dual fiber optic system 354 to the appropriate local control station 353, which can make the required controlling function through sensor or controller 350 via signal means 351. Alternatively such control functions could be sent directly from the monitoring buoy 375 to the central unit control station 356 via microwave link 362.

A communication system is also required for proper system operation and is depicted schematically on FIG. II. Audio console 380 and headsets 381 are provided for direct communication between operators on the platform 14 and, perhaps, maintenance personnel on unit 50. Each central array control station 356 will also have associated with it periphery equipment such as tape recorders 382 and visual displays 384 for monitoring and recording various signals and conditions. Additionally, similar recorders 382 and visual displays 384, as well as printers 388, will be located on the central platform 14. Transmission and communications means 400 as illustrated provides a means for communicating voice and data signals from platform 14 to shore (not shown). An alternative embodiment is the placement of the manned control station on shore in which case the platform 14 is unmanned.

Alternate Absorber Unit Configuration

The hinged raft configuration described in U.S. Pat. No. Re. 31,111 (the Hagen array) and shown in FIG. 12 is an alternative embodiment and, when tuned to higher absorption efficiency, may be a preferred embodiment for areas with large incident wave energy. The hinged array produces more total power but at somewhat greater cost when the tuning methods described herein are used to optimize performance. The alternate configuration is shown in FIG. 13. The operation and description of equipment is the same as that for the single raft but includes a plurality of rafts hinged together rather than a single raft 70.

Unit 51 shown in FIGS. 12 and 13 include three rafts 71, namely a bow raft 450, a medial raft 460, and an aft raft 470. Each raft has a beam of 90 feet and a length of 150 feet. The overall length of the unit 51 is 600 feet with a B/L (Beam to Length) ratio of 0.15. Each raft is constructed in modules. Rafts 450, 460, and 470 include a nose module 452, 462, and 472, a forward central module 454, 464, and 474, a rear central module 456, 466, and 476, and a rear module 458, 468, and 478, respectively. The nose and rear modules are on the ends of the rafts 450, 460, 470, and as shown in the main deck arrangment of FIG. 13, there are three types of end modules: bow module 452, female hinge modules 458, 472, male hinge modules 462, 468, and aft module 478. The position of an individual raft within a unit 51 will dictate the type of end module that is affixed to the raft's central modules.

Although the rafts 71 can be of varying sizes as described in U.S. Pat. Nos. 4,077,213 and 4,392,349, and Re. 31,111, the equal sizing and modular construction facilitates mass production and thus lowers the installed cost of the system. Additionally, maintenance costs are significantly diminished since rafts and their component parts are manufactured so as to be interchangeable.

Referring again to FIG. 13, two sets of hydraulic actuators 420 are employed with one set spanning across each of the two hinge lines 492, 496. Hydraulic actuators 420 include hydraulic pistons and cylinders 422, 424. The first set extends between bow raft 450 and medial raft 460 and the second set of hydraulic pistons and cylinders 424 extends between medial rafts 460 and aft raft 470. The individual hydraulic actuators of each set act in concert with the others. The number of hydraulic pistons and cylinders for each set will vary according to the design parameters hereinafter described. Each will be a hydraulic subset for a hydraulic system such as system 131 of the preferred embodiment.

For a sea state between 70 and 80 kilowatts per meter, an array of 60 units 51 will have an electrical capacity of 240 megawatts.

Systems Tuning

1. Introduction.

The wave driven power generation system 10 of the present invention is designed to extract maximum power from wave 22 of wave field 12 and convert that power to energy to transmit and deliver base load power to a shore station for distribution at a practical cost. As previously described, the power generation system 10 includes an array 20 of units 50 deployed about the central transmission platform 14 as shown in FIGS. 1 and 2. Array 20 in unit 50 is specifically designed to be an efficient power extracting means for a wave field at the particular geographic location of the installation.

In maximizing the efficiency of the power absorption by the present invention from a particular wave field for use in converting the power of the waves into useful and cost efficient base load power, a study is made of the characteristics of the typical waves of the wave field at the geographic location at which the power generation system 10 is to be used. Since the energy absorbed by a floating object interacting with the waves of a particular wave field depend upon the physical properties of that object, the physical parameters of unit 50 of the present invention are varied to optimize its extraction and absorption of power from an average wave in the wave field. As is hereinafter described in more detail, this is accomplished by determining the spectral density function of the typical waves for that region and varying the physical parameters of unit 50 to obtain an optimum response function of unit 50 to the typical waves making up the wave field. It is the objective of the present invention to tune these physical parameters to produce an optimum response function so as to maximize the absorption of the power represented by the spectral density function of the wave field.

2. Wave Characteristics

The typical wave observed at a given point in a wave field at a particular location is a composite of a myriad of waves having varying wave heights, frequencies, and directions. Wave 22 as illustrated in FIG. 12 is an example of such a composite of waves. The properties of the composite wave 22 will vary depending upon the location of the wave field in the world. Composite wave 22 is characterized in terms of significant wave height, wave frequency, and wave direction. As shown in FIG. 12, wave 22 has an average wave crest WC, an average wave height WH, and an average wave length WL, where WC is the length of the wave crest, WH is the vertical distance between the wave crest and trough, and WL is the horizontal distance between two adjacent crests and troughs. The time it takes for the wave crest to travel one wave length determines the wave frequency. Wave direction represents the direction of the propagation of a train of waves averaged over a large number of waves.

The spectral density function described the power available from the waves of a particular wave field. In determining the spectral density function of the wave at the geographic location of interest, the waves are viewed and their characteristics recorded. A record of ocean wave height at a fixed point in the wave field would typically look like the record shown in *Principles of Naval Architecture*, by J. E. Comstock, *Society Naval Architects*, 1967, figure 6 at page 613, incorporated herein by reference. Instantaneous wave height and period can be defined for any segment of the record as shown in the referenced figure. If a large number of recording instruments were arranged with spacing that is small compared to any of the wave dimensions, a contour map of wave height would be generated similar to that shown in Comstock, supra, figure 7 at 613. The wave pattern shown in the referenced figure 7 demonstrates the random character of real seas making up the wave field. The waves are short crested, that is the waves do not exhibit the long parallel crests that are associated with ocean waves when observed from the shoreline. Methods of characterizing waves with the complex nature have been developed. See Comstock, supra, at 611–620.

The energy content of a composite wave 22 is a function of wave height, frequency, and angle. The real sea not only has variations in wave height and frequency, but the direction of the waves is spread over a range of angles. The spectral density function describes the power content of the large number of waves of the wave field at different heights, frequencies, and direction. The spectral density function is dependent on both wave frequencies and angular variations of the incident waves. See "Available Ocean Wave Power and Prediction of Power Extracted by a Contouring Raft Conversion System," by E. K. Burdette and C. K. Gordon, *Journal of Energy Resources Technology*, December, 1983 incorporated herein by reference. This two-dimensional spectrum is difficult to measure in real seas. It has been the practice to simplify the problem of analyzing the wave energy spectrum by separating it into two parts, one dependent only on frequency, called the point spectrum, and the second, a function of frequency and angle, referred to as the angular spectrum. The point spectrum is a one-dimensional spectrum obtained by an angular integration of the two-dimensional spectrum from a record taken of powder incident from all angles at a fixed point.

Several forms for the point spectrum have been in common use. The Bretschneider spectrum described in "Observation of the Power Spectrum of Ocean Waves Using a Cloverleaf Buoy," by Hisaki Mitsuyasu, Fukuyo Tasai, Toshiro Suhara, Shinjiro Mizuno, Makoto Ohkusu, Tadao Honda, and Kunio Rikiiski, Research Institute for Applied Mechanics, Kyushu University, Fukuoka, Japan, Sept. 5, 1979, incorporated herein by reference, was used for the purposes of the present invention and its related wave energy analysis. (See also "Effect of Various Spectral Formulations in Predicting Responses of Marine Vehicles and Ocean Structures" by Michael K. Ochi and Susan L. Bales, D. W. Taylor Naval Ship R&D Center, Offshore Technology Conference, May 2-5, 1977, incorporated herein by reference.) The form of the spectrum is determined by the significant wave height, which is the average of the one-third highest waves and their wave period.

The angular spectrum, or the angular variation of waves about the average direction of incidence, usually the direction of the wind, is more difficult to measure, and less data is available for use in design calculations. See Comstock, supra, figures 14 and 15 at page 618. In the absence of data, the general practice has been to use a simple angular dependence in the form of a cosine square law. A more complex but more accurate representation of the angular dependence is set forth in Mitsuyasu, supra.

For purposes of the design of the present invention, only the point spectrum has been relied upon because the energy absorption of the present invention is insensitive to incident wave angle due to the proper selection of the beam to length ratio of unit 50. The absorption efficiency of unit 50 is high for waves at high angles of incidence and, therefore, the angular waves are assumed to be in a common direction, i.e. head seas.

Thus, to design the optimum physical properties of unit 50 for a particular installation, a scatter diagram is required. A scatter diagram is a matrix of the probability of occurrence of wave height and period for those waves in the wave field at the region of installation. Incident wave characteristics vary with geographic location and from season to season. Thus, the scatter diagram data must be available on a month-by-month or, at least, on a seasonal basis. It is preferable that wave data be collected over several years.

Each point in the scatter diagram can be represented by a single power spectral density function. Therefore, the scatter diagram is a probability distribution of incident wave power. For initial configuration selection, a spectrum representing the average of the scatter diagram is used. For final performance evaluation, including the effect of the cut-off point at high energy on economy, the scatter diagram must be used to represent the power production.

Referring now to FIG. 14, there is shown a single power spectral density function curve S(f), indicated by the letter S, for the waves 22 of wave field 12 shown in FIG. 1. This curve may represent a single point in the scatter diagram or the spectral density representing the average power of the scatter diagram. Since the power available from the waves is proportional to the square of the wave height, the occurrence of the different wave heights at various wave frequencies from the scatter diagram has been plotted in FIG. 14 as power curve S. Curve S is plotted on the ordinate as wave height squared (meters squared per hertz) and wave frequency is plotted on the abscissa (hertz). The area under the curve S is the total power or incident flux on the wave absorber or unit 50 for the actual waves in wave field 12.

3. Response Function.

The response function of a wave absorber such as unit 50, is a function that describes the power absorbed as a function of frequency. As hereinafter described in detail, the power extracted from the waves by an absorber is determined by mathematically integrating the product of the spectral density function and the response function over all frequencies. See Burdette and Gordon, supra.

The response of unit 50 to incident waves will depend upon, and to a great extent can be controlled by, the physical properties of the unit as, for example, the length of the yoke and raft; overall raft length; beam of the raft; mass of the raft; moment of inertia of the raft; impedance represented by power conversion equipment, hinge friction and hydrodynamic quantities such as added mass and damping.

In general, only a fraction of the incident energy can be absorbed by a floating body. The amount of absorption depends upon the number of degrees of freedom that are excited in the floating body. There are six degrees of freedom namely, heave, yaw, roll, surge, pitch, and sway. These are illustrated in *Marine Hydrodynamics* by J. N. Newman, The MIT Press (1977) at 286 incorporated herein by reference. A certain amount of energy absorbed will be dissipated as waves radiate outward from the body. The energy in the incident wave is either absorbed, reflected, or transmitted by the body.

The motion of the unit 50 in response to wave action is converted to useful power by means of hydraulic actuators or other means. The response function of the unit 50 is the power absorption measured at the hydraulic actuator as a function of frequency.

A described above, waves in the real sea environment are made up of a complex mixture of waves which are described by the power density spectrum. The power density spectrum is shown by the curve S in FIG. 14. The example power density spectrum in FIG. 14 represents the incident power in a wave with 1.9 meter wave height and a 10-second period.

For a given wave power density spectrum, the physical properties of the unit 50 are adjusted by the designer to achieve optimum power absorption, that is, maximum power per unit size of structure. The present invention teaches a method of selecting design parameters for the unit 50 to provide greatest energy conversion at least cost.

The response function of the unit 50 for complex random seas can be determined by measuring or calculating the response of the unit 50 in regular, sinusoidal waves. The response in random seas can then be determined by linear superposition of the response at each frequency of the regular wave response; that is, the energy absorbed in a sea containing a mixture of frequencies is the sum of the energy absorbed at each frequency.

FIG. 14 shows the response function for two different units with different physical parameters. The label on the ordinate, response function R(f), given in kilowatts per meter squared, is the power absorbed by the unit. The response curves $R_1$ and $R_2$ represent power absorbed per unit wave height squared as a function of frequency. The unit represented by curve $R_1$ has a raft length of 75 meters, a beam to length ratio of 0.3, a radius of gyration of three-tenths of the length of the raft and a hydraulic power system with constant hydraulic pressure. The unit represented by curve $R_2$ has a raft length of 100 meters, a beam to length ratio of 0.15, a radius of gyration Rg of five-tenths of the length of the raft and a hydraulic power system with velocity proportional hydraulic pressure. FIG. 14 shows how the amplitude and natural frequency of the rafts change as the length, beam to length ratio, and radius of gyration are varied.

Curves $R_1$ and $R_2$ in FIG. 14 represent the combined response of a raft in the pitch and heave modes only. FIG. 15 shows the motion of the raft as it responds to wave action in both pitch and heave where $L_H$ is the length of the raft, $L_Y$ is the length of the yoke, O is the stationary buoy, $Z_H$ is the vertical height of the raft caused by heave, $Z_P$ is the vertical height of the raft caused by pitch, A is the angle that is transformed into the motion of the hydraulic actuator, and P is the angle caused by pitch. The power generated by the unit is the work done in one wave period averaged over the period.

As the physical parameters of the unit are changed to increase the overlap between the power density curve S and the response function curve R, the absorbed power increases. The average power output and power per unit area of such design shown in FIG. 14 are shown in the table:

| Unit | L(m) | B/L | R | F | P(kw) | P/A (w/m²)/Rg |
|---|---|---|---|---|---|---|
| (1) | 75 | .30 | .3L | Constant Pressure | 480 | 280 |
| (2) | 100 | .15 | .5L | Velocity Proportional | 680 | 450 |

Where:
L is the length in meters
B/L is the ratio of raft beam to length
Rg is the radius of gyration (or the distance from the raft center to the center of mass of the ballasted raft)
F is the form of hydraulic actuator pressure which can be either constant pressure of pressure proportional to velocity of the actuator.

The improved performance of unit 2 over unit 1 is clear, not only in total power absorbed but also in the power absorbed per unit area at the waterline. As hereinafter described, the power per unit area, P/A is directly related to the cost of energy and is a useful criteria for measuring performance during the configuration selection process.

4. Design Process

General.

As previously described, the principal of design optimization of the present invention is to match the unit response function to the wave spectral density function for the wave environment in the proposed deployment area. The physical parameters of unit 50 are selected to maximize the power absorbed per the structural size of the unit such that the most economical system is realized.

The design process includes an initial selection of the configuration of the unit 50 followed by a fine tuning of unit 50, and in particular raft 70.

The initial configuration selection of unit 50 emphasizes the basic structural design of raft 70, which serves as the buoyant structure that responds to wave action; the mooring buoy assembly 300 which serves as the stable reference platform for unit 50; and the yoke 60 which connects the raft 70 to the mooring buoy assembly 300. Since unit 50 extracts power in both the heave and pitch modes of motion in response to the forces from the wave field, initial optimization studies are done with estimates of annual average wave energy incident at the proposed deployment site and estimates of the worst expected storm conditions. Certain of the system parameters, such as minimum allowable yoke length and anchor requirements, are dictated by the highest wave expected during the life of the system; usually an estimate of the 100 year wave is used for this purpose.

The initial selection of the configuration of system 10 is also dependent upon the capital cost of system 10 and the operating cost for producing power. The power produced per unit area of the raft (P/A) is closely related to the cost of energy and, therefore, serves as a filter for the initial selection of the configuration of unit 50. The minimum point on of the cost of power curve occurs at the peak of the P/A curve.

The figure of merit for cost is based on the structural cost per unit area times the area of the hull at the deck plus the cost per installed kilowatt of power machinery times the installed power capacity.

$$C(\$) = \frac{Cost}{Area} (Area) + \frac{Cost}{Kilowatt} (Kilowatts)$$

The cost of energy figure of merit is then determined by weighting the ratio of capital cost to power capacity by a factor that includes capital cost charges and the load factor for power production. The load factor is the fraction of power capacity that is produced averaged over one year. The figure of merit is therefore the following:

$$Ce(\$/Kw - Hr) = \frac{Capital\ Charges\ (\%)}{Load\ Factor\ (\%)} + Oper.\ \&\ Maint.\ Cost$$

The average electrical power is calculated to be 75% of the mean fluid power at the hydraulic actuators assuming a 75% equipment efficiency. Since the capital cost rises as peak power is increased, the equipment is sized to cut off power when increased capacity contributes little to annual average power.

The ultimate criteria for selecting a configuration is the cost of energy delivered by the system. Although the precise cost of energy will vary from place to place and from time to time, the cost will depend directly on the average power produced by the system in the course of a year and the total size of the structure required to produce the power. The above figure of merit has been developed as a direct measure of the cost of energy, although not necessarily a prediction of the exact cost for any particular location.

Power Absorption.

As parameters of each element of the system: raft, yoke and mooring buoy, are varied, the amplitude of motion and the natural frequency of the system in both the heave and pitch mode of motion are changed and thus, as previously described with respect to FIG. 14, the response function of unit 50 is changed. The objective is to tune system 10 for optimum performance by adjusting the physical parameters of the units 50 of array 20 so that the response function closely matches the wave spectral density function. During the tuning process, the power output of the system must be closely analyzed since as parameters are varied, the cost of the system will vary. Further, cost is more dependent on some parameters than others. The particular parameters of interest are:

Raft beam (or beam to length ratio)
Draft, (or mass)
Raft length

Power train damping, (single or double acting hydraulic)
Hydrodynamic added mass (a function of hull shape)
Hydrodynamic damping (a function of hull shape)
Mass moment of inertia of the raft
Mass moment of inertia of the added mass
Moment of the waterplane area
Yoke length and mass The equations of motion of the raft, yoke and mooring buoy system are complicated. A computer model that has been validated by model tests in a wave tank is used to compute the performance in response to incident waves of the absorber system as physical parameters of unit 50 are varied. The response function of the unit is then plotted from these measurements. FIG. 14 illustrates the change in the response function as parameters are varied.

Yoke

Power absorbed by the system is dependent upon the physical parameters of the raft 70 but is also inversely proportional to the length of yoke 60. The vertical load imposed on the mooring buoy 300 and the maximum hinge angle are also inversely proportional to the yoke length. Therefore, the length of yoke 60 is selected to provide maximum energy within the constraint of allowable loads on the mooring buoy 300 and allowable angle of rotation at the hinge during the worst expected storm conditions. A minimum length is required to prevent submerging one end of the raft in high seas. FIG. 15 shows the relationship between the hinge angle and the length of yoke 60 as the raft 70 heaves and pitches in response to wave motion. In the preferred embodiment of unit 50 for waves in the range of 70 kilowatts per meter, the yoke 60 has a length of 40 meters compared to a raft length of 100 meters. With seas of 30 kilowatts per meter, the yoke is 16 meters and the raft is 40 meters.

Raft

Power absorption by the wave energy system 10 is determined by calculating the convolution integral of the response function and the wave spectral density function. The wave spectral density function for initial optimization studies can be an average annual spectrum. The unit response function is determined by the physical parameters of the raft and yoke system identified above.

The parameters listed define the wave configuration of unit 50 and in particular raft 70. The design process is one of examining the effect of each of the parameters on the unit response function operator and selecting that configuration that provides the most efficient system 10. Initially a configuration is selected for testing where the length of the raft is one-half the average wave length for the wave field, allowing a large amplitude of pitch, and the length of the yoke is one-fourth the average wave length. Ideally, the heave and pitch motions of the unit 50 are maximized without making the yoke exorbitantly long. The total length of the unit 50 will be less than the average wave length of the incident seas for the average conditions.

1. Raft Beam. The total power absorbed from the incident waves is dependent on the beam of the raft 70. The relationship is not linear in that the absorption efficiency decreases as the beam to length ratio (B/L) of raft 70 increases. The decrease in efficiency is small as the B/L increases from 0.1 to 0.3. As the ratio of B/L increases above 0.3 the absorption efficiency falls off quickly. FIG. 16 is a plot of power per unit area on the ordinate in watts per square meter against the beam to length ratio plotted on the abscissa.

The most economically efficient system 10 is the one with the smallest B/L. However, another consideration is the total power produced by the system. The total power output increases as B/L increases; for small values of B/L total power is small. Therefore, selection of B/L is a compromise between economy and a minimum acceptable power from a single unit. In areas with high fuel cost, higher power output at somewhat higher unit cost is more attractive than small power output at lower cost.

2. Draft (Mass). For a given beam to length ratio the draft of raft 70 is directly dependent on the total mass of unit 50. A number of configurations of different drafts have been tested and the tests have shown that within certain limits the power output is not a strong function of draft. For a sea state of 70 kw/m, a draft of 3.0 meters is selected from the standpoint of construction efficiency. An increase in draft needed for structural rigidity will have little effect on performance.

3. Raft Length. Power output is strongly dependent on raft length. As incident wave power increases raft length for maximum power production increases. Power per unit area, however, shows a definite peak as raft length increases. FIG. 17 shows the variation in P/A with raft length for a raft with a B/L of 0.15 absorbing power from incident waves with power per unit crest length of 60 Kw/m.

As the length of raft 70 increases the power absorbed increases monotonically in proportion to length in the narrow range of length shown. The power per unit area of structure, P/A, however, shows a well-defined maximum indicating an optimum design length. As is the case with beam to length ratio, the length of raft 70 can be selected to produce somewhat more power at slightly higher cost if that is in the best interest of the system user.

4. Power Train Damping. The pressure in the hydraulic pistons presents an impedance to the extraction of wave energy by unit 50 that influences efficiency. Over a narrow range where the average power train damping is approximately equal to the hydrodynamic damping, the efficiency of unit 50 is not strongly dependent on damping. However, the efficiency is strongly dependent on the form of damping. Maximum power is transferred to the power train when piston pressure in the hydraulic actuator is proportional to the velocity of the motion of the piston which is directly proportional to the relative angular velocity between the yoke 60 and raft 70. Power systems have been tested with constant pressure and with velocity proportional damping. Velocity proportional damping is clearly superior. However, in practice, the velocity dependence of the system may have to be approximated by a stepped valve system or a proportional valve system. In FIG. 18, curve A illustrates the pressure acting on the piston for a velocity proportional pressure and graph B illustrates the pressure acting on the piston for a stepped constant pressure system which approximates a velocity proportional system. The ordinate is relative pressure acting on the hydraulic piston; the abscissa is time.

Another variation on the power train is the use of single acting hydraulic cylinders rather than double acting cylinders. A double acting cylinder is one that extracts power over a complete cycle of motion on both the forward and reverse strokes of the actuator piston. A single acting piston extracts energy only on one stroke or on one-half of a cycle. In FIG. 19 the relative response function, plotted on the ordinate, shows a much broader response for the single acting piston (dotted line curve) than for the double acting piston (solid line curve). Relative hydraulic damping, plotted on the abscissa, is the ratio of damping due to actuator piston pressure to damping as a result of viscus drag of water acting on the hull. The broader curve indicates that the system is less sensitive to changes in either hydrodynamic drag or in piston pressure. Therefore, over the wide range of operating conditions that occur in the ocean environment, the single acting piston is attractive. As can be determined from FIG. 19, the mechanical impedance of hydraulic actuator 120 is in the range of 0.2 to 0.7 for a double acting cylinder and in the range of 0.6 to 1.6 for a single acting cylinder.

5. Hydrodynamic Added Mass and Damping. The hydrodynamic added mass is the mass of water that is accelerated by the motion of raft 70. This mass contributes to the total inertia of unit 50 and can amount to 50% of the structural and ballasted mass or more. The added mass is influenced strongly by the shape of the hull of raft 70 and can be controlled, within limits, by selecting a hull configuration that provides the desired added mass.

Hydrodynamic damping is the viscous drag of water due to the velocity of the hull. The damping is velocity proportional and adds to the impedance of the power train. Damping is also a function of hull shape and is sensitive to the incident wave frequency. FIG. 20 illustrates the preferred shape of the hull of raft 70 for the unit 50. One objective of the aft hull shape is to avoid the hull making waves thereby losing energy.

The hull shape cannot be changed arbitrarily to control added mass and damping without influencing other parameters as discussed below. Calculations of performance must take into consideration the frequency dependence of the hydrodynamic coefficients. Discussions of the hydrodynamic coefficients may be found in Comstock, supra.

As an example, it may be desirable to reduce the natural pitching frequency of the unit to coincide more nearly with the peak of the sea spectrum. By increasing the underwater area of the hull at the bow and stern by the addition of horizontal plates, the added mass and drag will reduce the pitching frequency.

Hull shaping, such as "V" shaped bow and stern sections, can be used to reduce added mass and drag, thereby increasing the amplitude of motion. A combination of shaping and drag plates allows a great range of tuning capability.

The cost of hull shape modifications to standard hull shapes will be an important factor in implementing such concepts.

6. Moment of Inertia of Structure Mass and Added Mass. The moment of inertia of unit 50 is determined by the distribution of ballast in raft 70. The distribution of ballast can be controlled by the designer. The moment of inertia of the hydrodynamic added mass is uniformly distributed except for end effect which are small compared to the total moment of inertia. A raft with uniform loading over the area of the raft has a moment of inertia equal to:

$$I = R^2 \times (M),$$

where M is the total mass of the raft including ballast and R is the radius of gyration or the distance from the center of the raft at which all mass may be considered to be concentrated. For raft with uniform mass distribution, the radius of gyration is 0.288 times the length of the hull.

A raft with ballast concentrated near the ends of the raft at a distance of 0.4 times the hull length from the center has a moment of inertia of:

$$I = [0.4 \times (L_h)]^2 \times (M).$$

The natural frequency of raft 70 is inversely proportional to the moment of inertia. For the uniformly distributed mass system, the natural frequency of motion in response to wave action occurs at a higher frequency than the wave spectrum center frequency. The power absorption efficiency of unit 50 is increased by increasing the moment of inertia to match more closely the response function to the spectral density function.

The variation in response for two configurations, one with uniform loading and the other with mass concentrated at the ends of the raft, is shown in FIG. 21 where the response is plotted on the abscissa. The frequency of the response is shifted to a lower frequency and the amplitude of response is increased. The power per unit area in increased from 286 watts per square meter to 453 watts per square meter by the change in mass distribution alone. The radius of gyration is shown on FIG. 21 rather than the moment of inertia. Radius of gyration is the distance from the center of the raft at which all mass can be considered to be concentrated. A radius of gyration of 0.5 times the length of the raft at the waterline means that the deck length is greater than the waterline length.

7. Moment of the Waterplane Area. The moment of area is the distribution of area of the hull of raft 70 at the waterline. This quantity is defined by the hull shape. For a rectangular barge-shaped raft, the area at the deck and waterline are equal. By shaping the hull to reduce the area at the waterline relative to the deck area as shown in FIG. 20, the moment of area of the waterline can be reduced.

The natural frequency of motion of raft 70 in response to wave action is directly proportional to the waterplane moment. Greater control of the natural frequency is possible by varying the moment by hull shaping. The ratio of the mass moment of inertia and the waterplane moment of area is the quantity of greatest importance. By determining the frequency at the peak of the spectral density function as shown in FIG. 14, the preferred ratio of mass moment of inertia to waterplane moment of area for a particular wave field may be determined. For the spectral density function shown in FIG. 14 of a sea state of approximately 70 to 80 kw/m, the preferred ratio is five.

Possible changes in waterplane moment are the use of "V" shape hulls to reduce the area or inverted "V" hull shapes to increase the moment. For the preferred embodiment, the deck and ballast compartments are extended fore and aft to overhang the waterline. This change accomplished a reduction in natural pitching frequency. By selecting the waterline length to be properly tuned to the wave period, an optimum configuration resulted.

Mooring Buoy.

The mooring buoy 300 is a steel structure heavily ballasted to resist the vertical reaction forces transmitted to the buoy through yoke 60. Any movement of mooring buoy 300 causes a loss of power extraction by unit 50. See FIG. 15. The buoy is also shaped to resist the horizontal mooring loads imposed by the action of the waves on the hull of raft 70. It is preferred that mooring buoy 300 has a restricted vertical movement to less than one-half meter at its resonance frequency. This is a little higher than the average sea state. The buoy can become submerged as it resists the heaving motion of the water.

The design of the buoy is dictated by the dynamics of the entire system reacting to the incident waves. The buoy mass is sufficiently large to restrict the energy transmitted to the buoy to be less than 5% of the total useful energy absorbed by unit 50. The buoy requires sufficient buoyancy to hold up the weight of the frame and cylinder of buoy assembly 300. The cylinder contains water for added mass.

Optimization of raft 70 and yoke 60 is normally performed under the assumption that yoke 60 at the buoy end is restrained by a rigid mooring device. After the optimization of raft 70 and yoke 60, the mooring buoy 300 motions under the influence of the power train and mooring forces are considered. The motion of the buoy is calculated or measured in a model wave tank and the buoy size and mass adjusted to minimize the power absorbed by the buoy. It has been found that the preferred draft of the buoy is 100 meters and the depth is 50 nominal meters.

Preferred Embodiment.

The preferred embodiment is obtained as the optimum configuration for a given sea state defined by the average wave power. Power extraction is determined by performing a convolution of the response function with the power spectrum for each of the sea states and then obtaining the weighted average power. Complete configuration definitions indicate a range of variables because of the variations in sea conditions over relatively short distances along a coastline. A summary of optimum configurations for different sea states is shown in the following table.

TABLE

| SEA STATE (kw/m) | 16–25 | 25–40 | 40–60 | 60–70 | 70–80 |
|---|---|---|---|---|---|
| Raft | | | | | |
| Length (m) | 30 | 40 | 60 | 80 | 100 |
| Beam (m) | 4.5 | 6 | 9 | 12 | 15 |
| Draft (m) | 1.5 | 2 | 3 | 3 | 3 |
| Molded Depth (m) | 2 | 2.2 | 3.5 | 4 | 5 |
| Weight(Ballasted) (kg) | 205 | 485 | 1650 | 2900 | 4550 |
| Moment of Inertia (KgM$^2$ × 10$^6$) | 98 | 300 | 1600 | 5000 | 12000 |
| Yoke | | | | | |
| Length (m) | 12 | 16 | 24 | 32 | 40 |
| Mooring | | | | | |
| Buoy Diameter (m) | 2.5 | 4 | 6 | 8.5 | 10 |
| Buoy Draft (m) | 6 | 8 | 9 | 13 | 15 |
| Unit Electrical Capacity (kw) | 100 | 200 | 400 | 780 | 1000 |

Power Train Impedance: velocity proportional for all sea states.

The molded depth of hull 209 set forth above is the height from the bottom of the deck 140.

The optimum length of raft 70 is determined by the average annual sea state. The length is between 0.5 and 1.0 times the average annual wavelength for raft 70 and between 0.75 and 1.0 for unit 51 with three rafts 71. The precise length is determined by a detailed analysis of the seasonal variations of wave period. The wave period is given by: $L_w = 1.56\ T^2$ where T is the wave period.

As shown in the above table, the preferred embodiment varies with the sea state. The draft of the raft 70 ranges between 0.020 and 0.05 times the length of the unit 50 depending upon the sea state. The mooring means 300 has a draft of between 0.15 and 0.35 times the length of the raft 70. The draft of the raft 70 is maintained at less than 90% of the molded depth of the hull 209 of raft 70.

Operation

In operation, the waves 22 of wave field 12 impinge upon the units 50 comprising array 20 forming power generation system 10. Waves 22 thus applies a continuing rocking, lifting, falling, and longitudinal motion to each of the units 50 of array 20. Examining an individual unit 50, a length of the wave crest WC equal to the unit beam B impings unit 50 causing a portion of the wave crest to be reflected toward other units 50. Simultaneously, other portions of the wave crest are being reflected towards unit 50. The angular reflected waves also impinge on unit 50. With unit 50 appropriately tuned, the unit response will be within the frequency spectrum of waves 22 of wave field 12.

Raft 70 and yoke 60 of unit 50 rotate about the hinge line in response to the motion of the waves 22 with one end of yoke 60 being held relatively stationary by buoy assembly 300. The opposing ends of raft 70 having ballast, pivot and swing up and down. With the hydraulic actuators 120 extending between raft 70 and yoke 60, the up and down movement is mechanically communicated to the hydraulic actuators causing pistons 128 to reciprocate within cylinders 130. As pistons 128 reciprocate within cylinders 130, hydraulic fluid in the cylinders is displaced through the outlet conduits to the accumulators 162, 172. A constant head pressure is maintained on the accumulators 162, 172 to provide a constant hydraulic fluid pressure to motor generators 195, 196.

The hydraulic fluid from the accumulators 162, 172 drives the motor generators 195, 196 which produce electricity for transmission by transmission means 30 to central transmission platform 14. Ultimately, the electrical energy accumulated at platform 14 is transmitted by delivering means 16 to the land based power grid.

While a preferred embodiment of the invention has been shown and described, modifications thereof can be made by one skilled in the art without departing from the spirit of the invention.

I claim:

1. A power generation system for extracting energy from the motion of waves in a wave field and converting the energy into useful energy, comprising:
   a floating structure rotatably connected to a mooring buoy by means of a yoke and allowed to move in heave and pitch in response to the motion of the waves in the wave field;
   said mooring buoy acting as a stable reference platform to said floating structure;
   energy extraction means extending between said floating structure and said yoke and responsive to said motion of said floating structure for extracting energy from the heave and pitch motion of the waves; and
   energy conversion means disposed on said floating structure for converting said extracted energy into useful energy.

2. The system of claim 1 wherein said floating structure comprises a single float.

3. The system of claim 1 wherein said floating structure comprises a plurality of floats hinged together to permit said structure to follow the contour of the waves; said energy extraction means extending between adjacent floats.

4. The system of claim 1 wherein said yoke is pivotally connected to said mooring buoy whereby said floating structure is permitted to swing in response to the changing direction of the wave field.

5. The system of claim 1 wherein the beam to length ratio of said floating structure is between 0.10 and 0.3 depending upon the power in the waves incident on said structure.

6. The system of claim 1 wherein the draft of said floating structure is between 0.020 and 0.05 times the length of said floating structure and yoke.

7. The system of claim 1 wherein the overall length of the floating structure and yoke is proportional to between 0.50 and 1.0 times the average annual wave length of the incident wave field.

8. The system of claim 1 wherein said length of said floating structure is 30 meters when the power of the incident waves is between 16 and 25 kilowatts per meter.

9. The system of claim 1 wherein said length of said floating structure is 40 meters when the power of the incident waves is between 25 and 45 kilowatts per meter.

10. The system of claim 1 wherein said length of said floating structure is 60 meters when the power of the incident waves is between 40 and 60 kilowatts per meter.

11. The system of claim 1 wherein said length of said floating structure is 80 meters when the power of the incident waves is between 60 and 70 kilowatts per meter.

12. The system of claim 1 wherein said length of said floating structure is 100 meters when the power of the incident waves is between 70 and 80 kilowatts per meter.

13. The system of claim 2 wherein said float includes a hull having a raked bow and stern to minimize the making of waves by said float.

14. The apparatus of claim 2 wherein said float includes ballast compartments on each end thereof extending over the waterline of said float.

15. The system of claim 2 wherein said float includes ballast at the bow and aft of said float to increase the amplitude of response and lower the natural frequency of said float.

16. The system of claim 15 wherein said ballast includes water and high density sand maintained in ballast compartments located on the bow and aft of said float.

17. The system of claim 16 wherein the amount of said water used as ballast is varied to adjust the moment of inertia and control the natural period of motion of said float in accordance with the state of the wave field.

18. The system of claim 2 wherein mass is concentrated at the bow and aft of said float to achieve a radius of gyration of one-half times the length of said float at the waterline.

19. The system of claim 2 wherein the deck of said float is greater than the length of the hull of said float at the waterline.

20. The system of claim 2 wherein the ratio of the mass moment of inertia to waterplane moment of area of said float for a wave field having a sea state of 70 to 80 kilowatts per meter is five; said mass moment of inertia being determined by the distribution of the area of said deck and said waterplane moment being determined by the distribution of area of the hull of said float at the waterline.

21. The apparatus of claim 2 wherein said float has a buoyancy which creates a draft of less than 90% of the molded depth of said float.

22. The apparatus of claim 2 further including energy accumulation mans connected to said energy extracting means for accumulating the extracted energy.

23. The apparatus of claim 22 wherein said energy accumulation means is housed within said float.

24. The system of claim 1 further including means for varying the reaction force of the power extraction means in a manner that is proportional to the relative angular velocity between said yoke and said floating structure.

25. The system of claim 1 wherein said energy extraction means includes at least one hydraulic actuator extending between said yoke and float; said actuator including a piston, cylinder and associated valves; said valves causing the piston pressure in said actuator to be proportional to the velocity of the motion of said piston.

26. The system of claim 1 wherein said energy extraction means includes a hydraulic actuator extending between said yoke and float; said actuator including at least one double acting piston and cylinder whereby power is extracted over a complete cycle of motion on both the forward and reverse strokes of said piston within said cylinder.

27. The system of claim 26 wherein the ratio of mechanical impedance of said actuator to hydrodynamic damping is in the range of 0.2 to 0.7 for said double acting cylinder.

28. The apparatus of claim 2 wherein said energy extraction means includes lever means for converting the upward and downward movement of each of said float and yoke into a driving force, said lever means being connected with said float and yoke such that wave energy is converted into mechanical energy at said lever means.

29. The apparatus of claim 28 wherein said float and yoke are connected by a plurality of pivot means for allowing the opposing ends of said float and yoke to swing about said pivot means in one dimension.

30. The apparatus of claim 2 wherein said energy extraction means comprises a plurality of hydraulic actuators, each of said hydraulic actuators including
 a piston comprising a connecting rod and head, said head affixed to the first end of said connecting rod,
 a cylinder for receiving said head of said piston to as to allow said piston to reciprocate within said cylinder,
 support means for affixing said cylinder and said piston within said float,
 means for affixing the second end of said connecting rod to said yoke.

31. The apparatus of claim 30 wherein said support means comprises
 mounting means for attaching said cylinder to the bottom of said float;
 a top of said float having an aperture through which said connecting rod may extend,
 linkage means for supporting said connecting rod within said float and allowing said connecting rod to both reciprocate and oscillate,
 seal means for preventing the entrance of water into the interior of said float.

32. The apparatus of claim 31 wherein said linkage means comprises
   a teflon sleeve attached to said connecting rod,
   a seal carrier including an aperture for receiving said teflon sleeve and being slidingly attached to said teflon sleeve,
   a plurality of connecting linkages affixing said seal carrier to the top of said float so as to allow angular movement of said connecting rod.

33. The apparatus of claim 31 wherein said seal means comprises
   a sleeve attached to said connecting rod,
   a seal carrier including an aperture for receiving said sleeve and being slidingly attached to said sleeve,
   said seal carrier further including a gland for receiving a seal,
   a seal for sealing between said seal carrier and said connecting rod,
   a flexible boot sealing attached to said seal carrier and the top of said float for preventing water from entering said float.

34. The system of claim 1 wherein said mooring buoy is ballasted to restrict the vertical movement of said mooring buoy to less than one-half meter at the resonance frequency of said mooring buoy.

35. The system of claim 1 wherein the mass of said mooring buoy restricts the energy transmitted to said mooring buoy to less than 5% of the total useful energy absorbed by said yoke and floating structure.

36. The system of claim 35 wherein water is added to said mooring buoy for added mass.

37. The system of claim 1 wherein the mass of said mooring buoy has a draft of between 0.15 and 0.35 times the length of said floating structure.

38. The system of claim 1 wherein the length of said yoke is inversely proportional to the vertical load imposed by said yoke on said mooring buoy and is constrained by the maximum angle of rotation of said rotatable connection during the worst expected storm conditions of the wave field; said length of said yoke being selected to provide maximum energy within the constraint of said vertical loads on said mooring buoy and said maximum angle of rotation.

39. A power generation system for extracting energy from the motion of waves in a wave field and converting the wave energy into useful energy, comprising:
   an array of a plurality of absorber units positioned within a wave field in a predetermined pattern relative to one another;
   each absorber unit including at least one float connected to a buoy by means of a yoke and allowed to move in heave and pitch in response to the motion of the waves;
   energy extracting means disposed on each said absorber unit and extending between said float and yoke responsive to said motion of said float for extracting energy from the motion of the waves; and
   energy conversion means disposed on each said absorber unit for converting said extracted energy into useful energy; and
   means for accumulating the useful energy generated by all said units.

40. The system of claim 39 wherein each said absorber unit is moored to the sea floor and allowed to swing with the direction of the waves.

41. The system of claim 39 wherein said array for a sea state of between 70 and 80 kilowatts per meter comprises over sixty absorber units and has an electrical capacity of 60 megawatts.

42. The system of claim 39 wherein said accumulation means annually distributes approximately 180 gigawatt-hours of useful energy from said array.

43. The system of claim 39 wherein said absorber unit comprises three floats.

44. The system of claim 43 wherein said array for a sea state of between 70 and 80 kilowatts per meter comprises sixty absorber units and has an electrical capacity of 240 megawatts.

45. The system of claim 39 wherein the predetermined pattern of said plurality of absorber units comprises a matrix of rows and columns of absorber units, each absorber unit of said array having its longitudinal dimension pointed in a substantially lineal direction parallel to the prevailing wave direction.

46. The system of claim 39 wherein said absorber units are off-set in relationship whereby at least a rear one of said plurality of absorber units is obliquely rearward of a forward absorber unit and pointed in a substantially lineal direction parallel to the prevailing wave direction.

47. The system of claim 45 wherein the rows are at least 1.7 times the length of one of said plurality of absorber units.

48. The system of claim 45 wherein the columns are approximately 2.0 times the length of one of said plurality of absorber units.

49. The system of claim 45 wherein said plurality of absorber units are positioned within the perimeter of a circle having a radius of between 10 and 11 times the length of one of said plurality of absorber units.

50. The system of claim 39 wherein said plurality of absorber units are positioned in water having a depth of between 50 and 300 feet.

51. The system of claim 39 wherein said accumulation means comprises a central platform located within the predetermined pattern of said plurality of absorber units, said central platform supporting means for accumulating the useful energy.

52. A flotation member for a power generation system to convert wave energy into useful energy, comprising:
   a nose module;
   a central module affixed to said nose module;
   a rear module affixed to said central module;
   said modules being buoyant permitting the flotation member to be seaworthy; and
   said nose and rear modules having ballast enhancing the response of the flotation member to the motion of the waves.

53. The flotation member of claim 52 wherein said nose module includes a rearwardly and downwardly tapered front section for reacting with the waves.

54. The flotation member of claim 52 wherein said nose module includes a hinge for connection with another flotation member.

55. The flotation member of claim 52 wherein said central module houses means for converting hydraulic energy to electrical energy.

56. Apparatus for extracting energy from the motion of waves, comprising:
   an absorber unit having a float connected to a yoke;
   connecting means for rotatable connection said float and said yoke while allowing said float and yoke to move in response to the motion of the waves;

energy extraction means responsive to the motion of said float and yoke for extracting energy from the motion of the waves, said energy extraction means including hydraulic actuators for displacing hydraulic fluid in a closed hydraulic system in response to the movement of said float and yoke, and further including pressure adjustment means for adjusting the pressure in the hydraulic system so as to adjust the energy extracted.

57. Apparatus for extracting energy from the motion of waves, comprising:

an absorber unit having a plurality of buoyant members rotatably connected in series to form an articulated absorber unit; said absorber unit connected to one end of a yoke;

a mooring buoy acting as a stable reference platform connected to the other end of said yoke;

articulation means for connecting said buoyant member to said yoke;

said absorber unit having a beam and a length, said absorber unit length approximately equal to 0.75 to 1.0 times the average wavelength of the waves;

said buoyant member moving relative to said yoke in response to the motion of the waves; and extracting means responsive to the relative movement of said buoyant member and yoke for extracting useful energy.

58. The apparatus of claim 57 wherein said absorber unit includes a plurality of floats comprising a bow float, a medial float, and an aft float connected by said connecting means in a serial relationship.

59. The apparatus of claim 58 wherein said bow float comprises
a nose module including a rearwardly downwardly tapered front section for reaction with the waves,
a forward central module affixed to said nose module,
a rearward central module affixed to said forward central module, a rear module affixed to said rearwardly central module,
said rear module including hinge means for connecting said rear module of said bow float to said forward medial float.

60. The apparatus of claim 58 wherein said medial float comprises
a nose module including hinge means for connecting said nose module to said bow float and further including hydraulic actuators for absorbing wave energy,
a forward central module affixed to said nose module and including accumulators, motor generators, and a reservoir for hydraulic fluid,
a rearward central module affixed to said forward central module including motor generator, and transformer,
a rear module affixed to said rearwardly central module including hinge means for connecting said rear module to said aft float.

61. The apparatus of claim 58 wherein said aft float comprises
a nose module including hinge means for connecting said nose module to said medial float,
a forward central module affixed to said nose module,
a rearward central module affixed to said forward central module,
a rear module affixed to said rearward central module.

62. The apparatus of claim 57 wherein said connecting means comprises
a male hinge module affixed to one end of said float;
a female hinge module affixed to one end of said yoke;
said male hinge module having a plurality of male portions,
said female hinge module having an equal plurality of female portions,
an equal plurality of pins for affixing said male hinge module to said female hinge modules so as to allow relative movement of said floats.

63. The apparatus of claim 62 further comprising bearing means for supporting said pins,
sealing means for preventing water from entering said hinge modules or said pins.

64. An apparatus for extracting power from the motion of waves in a wave field, the energy of the wave field being measured by its spectral density function, comprising:

an absorber unit including a yoke, a raft, and hinge means for rotatably connecting one end of said yoke to the bow of said raft; the other end of said yoke being pivotally connected to a mooring buoy;

said mooring buoy acting as a stable reference platform for said absorber unit;

hydraulic actuator means extending between said float and yoke and responsive to the heave and pitch of said float caused by the motion of the waves for extracting power from the wave field;

said extracted power of said absorber unit being measured by the response function of said absorber unit;

the length of said raft, the beam of said raft, the mass of said raft, the mass moment of inertia of said raft, the impedance of said hydraulic actuator means, the hydrodynamic added mass of said raft, the hydrodynamic damping of said raft, the mass moment of inertia of the added mass to said raft, the moment of the waterplane area of said raft, and the length and mass of said yoke being tuned to produce said response function as to approximate the spectral density function of the wave field whereby maximum power is extracted by said absorber unit from the energy available in the wave field.

65. The apparatus of claim 64 wherein said absorber unit is sized such that the ratio of said power extracted by said absorber unit per unit deck area of said raft is maximized to attain maximum economic efficiency of said absorber unit.

66. The apparatus of claim 64 wherein the sea state of the wave field is 70 to 80 kilowatts per meter, said raft has a length of approximately 100 meters, a beam to length ratio of 0.15, a draft of 3 meters, a molded depth of 5 meters, a weight of 4550 kg, a moment of inertia of $12000 \times 10^6$ kgm$^2$ and a power train impedance which is velocity proportional.

67. The apparatus of claim 64 wherein the sea state of the wave field is 70 to 80 kilowatts per meter, said yoke has a length of 40 meters and said mooring buoy has a diameter of 10 meters and a draft of 15 meters.

68. The apparatus of claim 64 further including means disposed on said raft for storing said extracted power.

* * * * *

UNITED STATES PATENT AND TRADEMARK OFFICE
CERTIFICATE OF CORRECTION

PATENT NO. : 4,781,023
DATED : NOVEMBER 1, 1988
INVENTOR(S) : CARROLL K. GORDON

Page 1 of 2

It is certified that error appears in the above—identified patent and that said Letters Patent is hereby corrected as shown below:

[57] Abstract, line 16, begin a new paragraph at "Each unit of the array is tuned to a condition for..."

After Sheet 14, Fig. 18 and Fig. 19, insert -- Sheet 15, Fig. 20 and Fig. 21.--

On column 13, line 4: delete "or" and insert -- of --.
On column 13, line 5: delete "the" and insert -- tie --.
On column 14, line 23: delete "II" and insert -- 11 --.
On column 16, line 13: delete "described" and insert -- describes --.
On column 23, line 66: ".. where M is the total mass ..." through column 24: line 3: "... 0.288 times the length of the hull." is a continuation of the blocked indented paragraph that begins on line 64, and therefore, the remainder of the paragraph should also be block indented.
On column 28, line 9: delete "mans" and insert -- means --.

Insert Fig. 20 and Fig. 21, as shown on the attached sheet.

Signed and Sealed this

Sixth Day of November, 1990

Attest:

HARRY F. MANBECK, JR.

Attesting Officer

Commissioner of Patents and Trademarks